(12) United States Patent
Lee et al.

(10) Patent No.: US 8,953,559 B2
(45) Date of Patent: Feb. 10, 2015

(54) METHOD AND APPARATUS FOR SUPPORTING NETWORK-BASED FLOW MOBILITY

(71) Applicants: Electronics and Telecommunications Research Institute, Daejeon-si (KR); Korea University of Technology and Education Industry-University Cooperation Foundation, Chungcheongnam-do (KR)

(72) Inventors: Kyoung Hee Lee, Daejeon-si (KR); Sung Kuen Lee, Gyeonggi-do (KR); Youn Hee Han, Daejeon-si (KR); Hyun Woo Lee, Daejeon-si (KR); Won Ryu, Daejeon-si (KR)

(73) Assignees: Electronics and Telecommunications Research Institute, Daejeon-si (KR); Korea University of Technology and Education Industry-University Cooperation Foundation, Cheonan-si, Chungcheongnam-do (KR)

( * ) Notice: Subject to any disclaimer, the term of this patent is extended or adjusted under 35 U.S.C. 154(b) by 100 days.

(21) Appl. No.: 13/658,303

(22) Filed: Oct. 23, 2012

(65) Prior Publication Data

US 2013/0100930 A1  Apr. 25, 2013

(30) Foreign Application Priority Data

Oct. 24, 2011 (KR) .................. 10-2011-0108972
Sep. 13, 2012 (KR) .................. 10-2012-0101706

(51) Int. Cl.
*H04W 4/00* (2009.01)
*H04L 12/28* (2006.01)
(Continued)

(52) U.S. Cl.
CPC ............ *H04W 60/005* (2013.01); *H04W 40/36* (2013.01); *H04W 8/02* (2013.01); *H04W 36/005* (2013.01); *H04W 36/22* (2013.01); *H04W 36/32* (2013.01); *H04W 80/04* (2013.01)
USPC ............ 370/331; 370/392; 455/437; 455/442

(58) Field of Classification Search
None
See application file for complete search history.

(56) References Cited

U.S. PATENT DOCUMENTS 6,980,802 B2 * 12/2005 Jung ............................. 455/436
2007/0133471 A1 * 6/2007 Kim et al. ..................... 370/331
(Continued)

FOREIGN PATENT DOCUMENTS

KR      1020060107889 A      10/2006
KR      10-1000108 B1        12/2010
KR      1020110071770 A       6/2011

OTHER PUBLICATIONS

G. Tsirtsis et al., RFC 6089: Flow Bindings in Mobile IPv6 and Network Mobility (NEMO) Basic Support, Internet Engineering Task Force, Jan. 2011.*
M. Hui, et al; "Service Flow Identifier in Proxy Mobile IPv6", IETF NETEXT WG, Jul. 1, 2010; 15 pages.

*Primary Examiner* — Faruk Hamza
*Assistant Examiner* — Cassandra Decker
(74) *Attorney, Agent, or Firm* — Ladas & Parry LLP

(57) ABSTRACT

The present invention relates to a method and apparatus for supporting location registration and mobility for each service flow in relation to a Mobile Node (MN) having a plurality of wired/wireless network interfaces in a wired/wireless integrated network environment. A method includes receiving a location registration message from a specific Handover Control Agent (HCA) connected to an MN, determining a movement of a flow, configured in another HCA to which the MN is connected, based on predetermined static flow binding information or a network status, sending a location registration Ack. message, comprising information on a HCA in which the flow is configured and to which a Corresponding Node (CN) is connected, to the specific HCA, and sending a location notification message, comprising information on the specific HCA to which the flow will be moved and to which the CN is connected, to the HCA.

14 Claims, 19 Drawing Sheets

(51) Int. Cl.
*H04W 36/00* (2009.01)
*H04W 60/00* (2009.01)
*H04W 40/36* (2009.01)
*H04W 8/02* (2009.01)
*H04W 36/22* (2009.01)
*H04W 36/32* (2009.01)
*H04W 80/04* (2009.01)

(56) References Cited

U.S. PATENT DOCUMENTS

| | | | |
|---|---|---|---|
| 2008/0305799 A1* | 12/2008 | Zuniga et al. | 455/437 |
| 2009/0147759 A1* | 6/2009 | Um et al. | 370/338 |
| 2011/0103260 A1* | 5/2011 | Jeyatharan et al. | 370/254 |
| 2011/0216680 A1* | 9/2011 | Vogt et al. | 370/310 |
| 2012/0093062 A1* | 4/2012 | Perras et al. | 370/315 |

* cited by examiner

METHOD AND APPARATUS FOR SUPPORTING NETWORK-BASED FLOW MOBILITY

Priority to Korean patent application numbers 10-2011-0108972 filed on Oct. 24, 2011 and 10-2012-0101706 filed on Sep. 13, 2012, the entire disclosure of which are incorporated by reference herein, is claimed.

BACKGROUND OF THE INVENTION

1. Field of the Invention

The present invention relates to networking and, more particularly, to a method and apparatus for supporting location registration and mobility for each service flow in relation to a Mobile Node (MN) having a plurality of wired/wireless network interfaces in a wired/wireless integrated network environment.

2. Discussion of the Related Art

At the present time, not only wired communication techniques, such as Ethernet and Fiber-To-The-Home (FTTH), but also a variety of radio access techniques, such as a Wireless Local Area Network (WLAN), Wibro, 3G (e.g., CDMA), and 3.5G (e.g., HSPA), appear, and they are being provided to users. In line with a change in this communication environment, active researches are being carried out on uniquitous mobile networking service in order to provide users with various convergence multimedia services having optimum quality anytime and anywhere by combining a variety of wired/wireless techniques for the interworking of heterogeneous networks.

For multimedia service through a plurality of communication networks, communication technology that is focused on a multi-mode MN on which a plurality of wired/wireless interfaces is mounted becomes influential. Accordingly, it is necessary to supplement and modify networking techniques that are taken into account in a single-mode MN on which the existing node interface is mounted. In the existing MN mobility technique, how each service flow will be managed has not been taken into account in a situation in which a number of communication connections are maintained because the existing MN mobility technique has been chiefly developed based on a handover control function for switch between network interfaces and processing a change of a network access path. In particular, the choice of an interface based on a service data character is important because Quality of Service (QoS) characteristics provided by networks are different from one another. Furthermore, if a specific interface is not capable of communication due to reasons, such as a movement of an MN or the quality of a network, data flows that use the specific interface have to be redistributed over other interfaces. Accordingly, mobility support method for each service, that is, flow-based mobility support technology, must be taken into consideration in order to provide service to each flow in an optimum network environment by incorporating the characteristics of specific service (or flow) and subscriber preference into the mobility support method.

At the present time, regarding the flow-based mobility support technology, researches are focused on network-based IP mobility support technology (e.g., IETF Proxy MIPv6 (PMIPv6)) rather than on node-based Internet Protocol (IP) mobility support technology (e.g., IETE Mobile IPv6). In PMIPv6, a Mobile Access Gateway (MAG) function is embodied in the access router of an MN, and a core network has a Local Mobility Anchor (LMA) function. PIMPv6 describes a procedure in which if an MN moves to an area managed by an MAG, the MAG registers mobility binding information on the MN with an LMA. That is, in accordance with PMIPv6, an MN in which a function for IP mobility management (e.g., Mobile IPv6) has not been embodied can manage IP mobility through signaling between an MAG and an LMA within a network. Here, an LMA operates a kind of Home Agent (HA) for an MN within an access network, and an MAG supports the mobility of an MN instead of the MN.

Furthermore, researches are carried out on the support of flow-based mobility by extending and improving PMIPv6 on the basis of 'Internet Engineering Task Force Network-based Mobility Extension Working Group (IETF NETEXT WG)'. More particularly, the following schemes are being discussed.

(1) An article "Service Flow Identifier in Proxy Mobile IPv6 (draft-hui-netext-service-flow-identifier-00)" defines the format of a service flow identifier option for informing an LMA of specific service flow information in PMIPv6 and proposes a method of including the format in control messages that are exchanged by an MN in handover processing. In the method proposed by the article, a point of time at which an MN uploads this service flow identifier option onto an LMA is determined as the time when an MAG receives packets, belonging to a new service flow, from a specific interface of the MN. This method, however, is problematic in that necessary service flow binding is requested only when data traffic of a new service flow, that is, uplink packets, is transmitted from an MN to an MAG and this service flow binding cannot be requested when the traffic is transmitted from a Corresponding Node (CN) to a corresponding MN. Accordingly, if downlink traffic arrives at an LMA while uplink traffic is temporarily absent after handover, the downlink traffic arrives at an interface that is now unwanted by the MN.

(2) An article "Flow Binding in Proxy Mobile IPv6 (draft-xia-netext-flow-binding-00)" proposes a method of reusing a flow label that is used to manage flows in Mobile IPv6 without newly defining the format of a service flow identifier option. However, a binding policy for each service for inducing service flow handover depends on the profile of an MN or a service provider policy. That is, a binding method regarding a specific flow is stored in a database for managing several pieces of information on an MN, and service flow binding is started based on the stored information. The method proposed by this article is problematic in that a user who uses an MN actually lets management for each flow to be performed on the basis of only static and previously stored information irrespective of desired preference. For example, if there is statement that VoIP service traffic must be exchanged through a WLAN interface in a previously stored profile, a user may want to use VoIP service using a 3GPP interface according to circumstances. In this case, the VoIP service is not supported in the method proposed by this article.

(3) An article "Flow Handover for Proxy Mobile IPv6 (draft-koodli-netext-flow-handover-00)" defines additional signaling messages for flow handover and proposes a method of putting an IP address and a port number into each flow label. Like the method (2), this method is problematic in that dynamic user preference cannot be incorporated because this method depends on the static profile of an MN or the policy of a service provider and thus generates the handover of a service flow.

SUMMARY OF THE INVENTION

An object of the present invention is to provide the location registration procedure for a Multi-Mode (MN) MN having a plurality of wired/wireless network interfaces, a binding registration procedure for each flow, a procedure for transmitting flow-based data, and a procedure for performing handover for each flow according to Access Independent Mobility Service (AIMS) technology, that is, a network-based mobility support method.

Another object of the present invention is to provide a binding information management structure and method, a control message transfer flow, and a system operation method for applying flow-based mobility control technology to an actual network environment.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
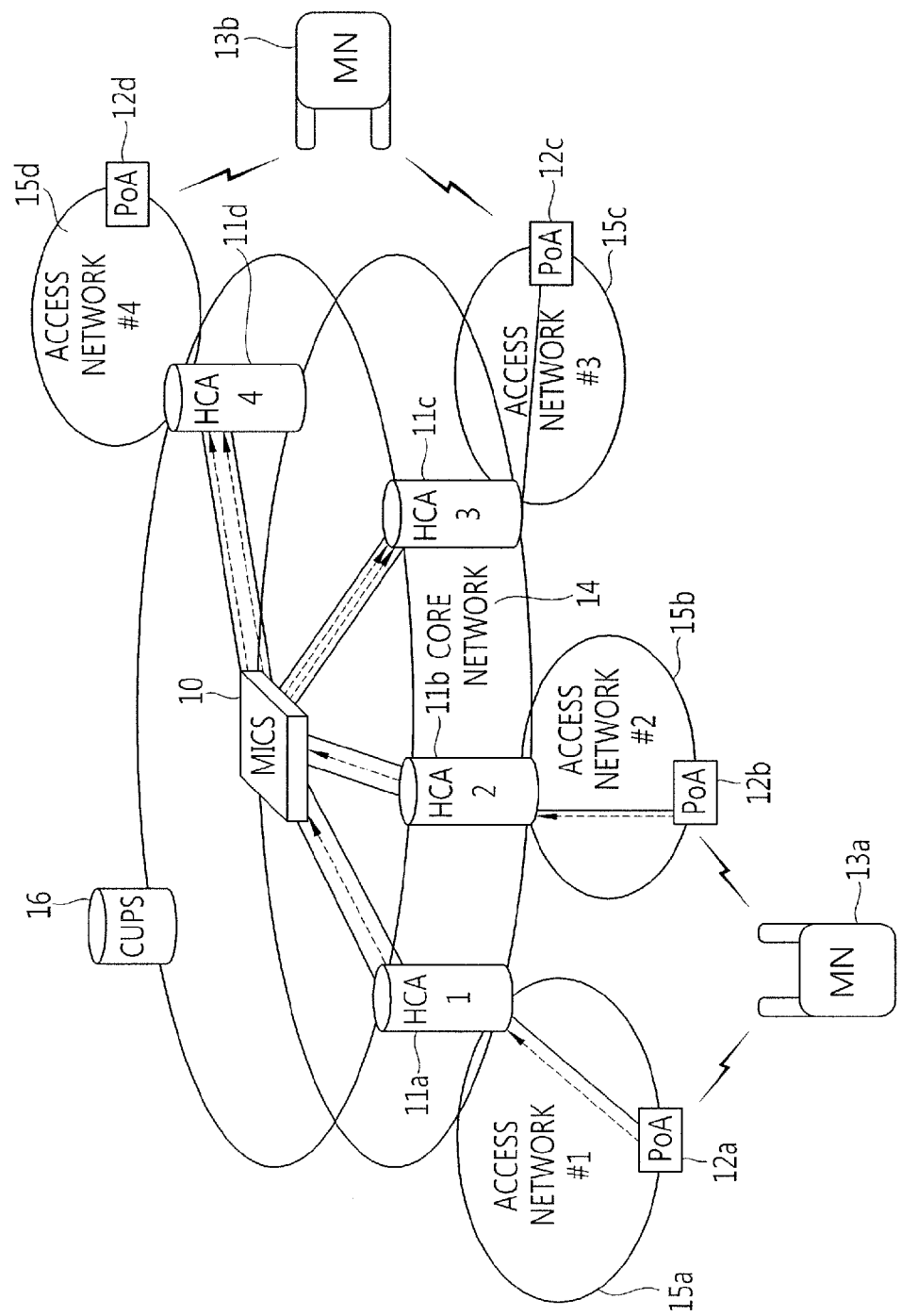
FIG. 1 shows a configuration of a network which supports multi-access in an AIMS system in accordance with the present invention.

Hereinafter, in this specification, some embodiments of the present invention are described in detail with reference to exemplary drawings. It is to be noted that in assigning reference numerals to elements in each of the drawings, the same reference numerals designate the same elements throughout the drawings although the elements are shown in different drawings. Furthermore, in describing the embodiments of the present invention, a detailed description of the known functions and constructions will be omitted if it is deemed to make the gist of the present invention unnecessarily vague.

Furthermore, in describing the elements of this specification, terms, such as the first, second, (1), (2), (a), and (b), may be used. However, the terms are used to only distinguish one element from the other element, but the essence, order, or sequence of the elements is not limited by the terms. When it is said that one element is "connected", "combined", or "coupled" with the other element, the one element may be directly connected or coupled with the other element, but it should be understood that a third element may be "connected", "combined", or "coupled" between the two elements.

A network-based mobility support method in accordance with the present invention can provide flow-based location registration and mobility to an MN having a plurality of wired/wireless interfaces. To this end, the present invention proposes 1. An AIMS system and registration procedure for Care-of-Address (CoA) registration, 2. The stack architecture and flow management scheme of a Mobile Node (MN), 3. The flow management scheme of a Mobility Information Control Server (MICS) and a Handover Control Agent (HCA), 4. A process of transferring an initial data flow, and 5. A flow mobility procedure.

1. AIMS System and Registration Procedure for Care-of-Address (CoA) Registration FIG. 1 shows a configuration of a network which supports multi-access in an AIMS system in accordance with the present invention.

Referring to FIG. 1, the AIMS system includes an MICS 10 placed within a core network 14, Handover Control Agents (HCAs) 11a, 11b, 11c, and 11d placed within respective access networks 15a, 15b, 15c, and 15d, Point of Attachments (PoAs) 12a, 12b, 12c, and 12d configured to provide radio link connection to Mobile Nodes (MNs) 13a and 13b, and the MNs 13a and 13b configured to move between the access networks. The AIMS system may further include a Converged User Profile Server (CUPS) 16 for managing subscriber profiles for access networks.

The MNs 13a and 13b can connect to one or more access networks at the same time through one or more interfaces. The MICS 10 may register information (e.g., a CoA) about the HCAs 11a, 11b, 11c, and 11d in the access networks 15a, 15b, 15c, and 15d to which the MNs 13a and 13b are connected. Here, the CoA indicates a CoA for encapsulation by providing information on a current connection point of an MN in a mobile IP network. Furthermore, when the MN 13a communicates with the MN 13b, the HCAs 11c and 11d in the access networks 15c and 15d to which the MN 13b is connected must be informed of information on the HCAs 11a and 11b in the access networks 15a and 15b to which the MN 13a is connected, and vice versa. That is, the HCAs 11a and 11b have to maintain information on the HCAs 11c and 11d as information on the location of the MN 13b, and the HCAs 11c and 11d have to maintain information on the HCAs 11a and 11b as information on the location of the MN 13a. Signaling for this function is supported.

(1) Use of Virtual Interface (VI) and Allocation of a Home Address (HoA)

Figure 2:
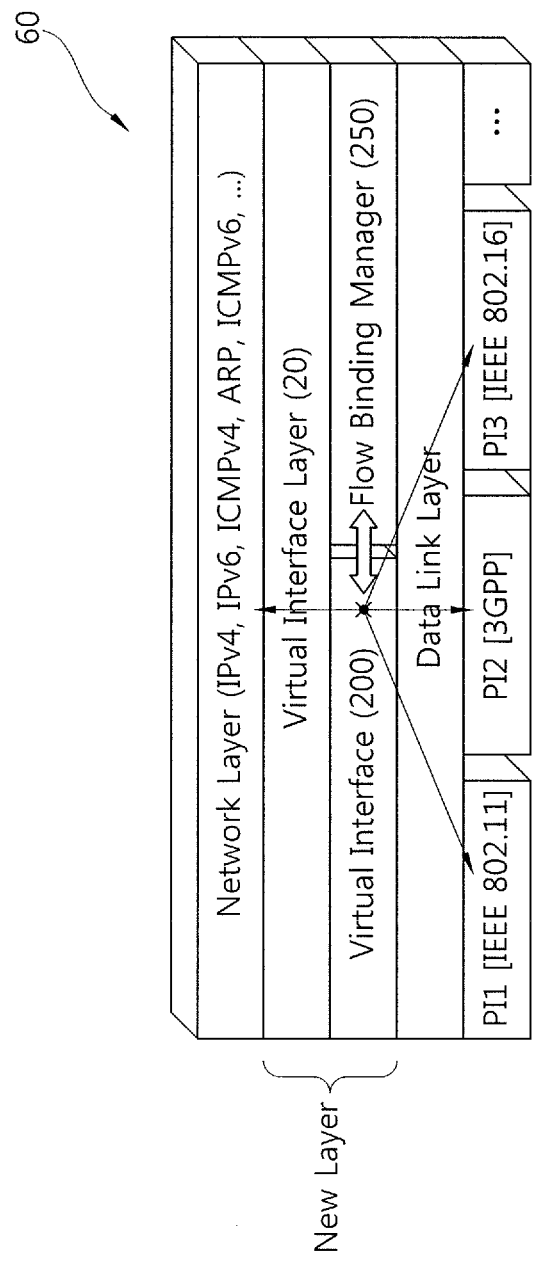
FIG. 2 shows the virtual interface layer of an MN in accordance with the present invention.

FIG. 2 shows the virtual interface layer of an MN in accordance with the present invention. The virtual interface layer includes the top of a data link layer constructed in the protocol stack of an MN and the bottom of a network layer.

Referring to FIG. 2, the virtual interface layer 20 includes a virtual interface 200 and a flow binding manager 250.

All fixed IP addresses (e.g., HoAs) allocated by a HCA that forms an AIMS system are allocated to the virtual interface 200.

The flow binding manager 250 determines whether packets downloaded from a higher layer to the virtual interface 200 will be transferred to what Physical Interface (PI). In this specification, an Interface (IF) may mean a physical interface hereinafter. A detailed operation of the flow binding manager 250 is described later.

Figure 3:
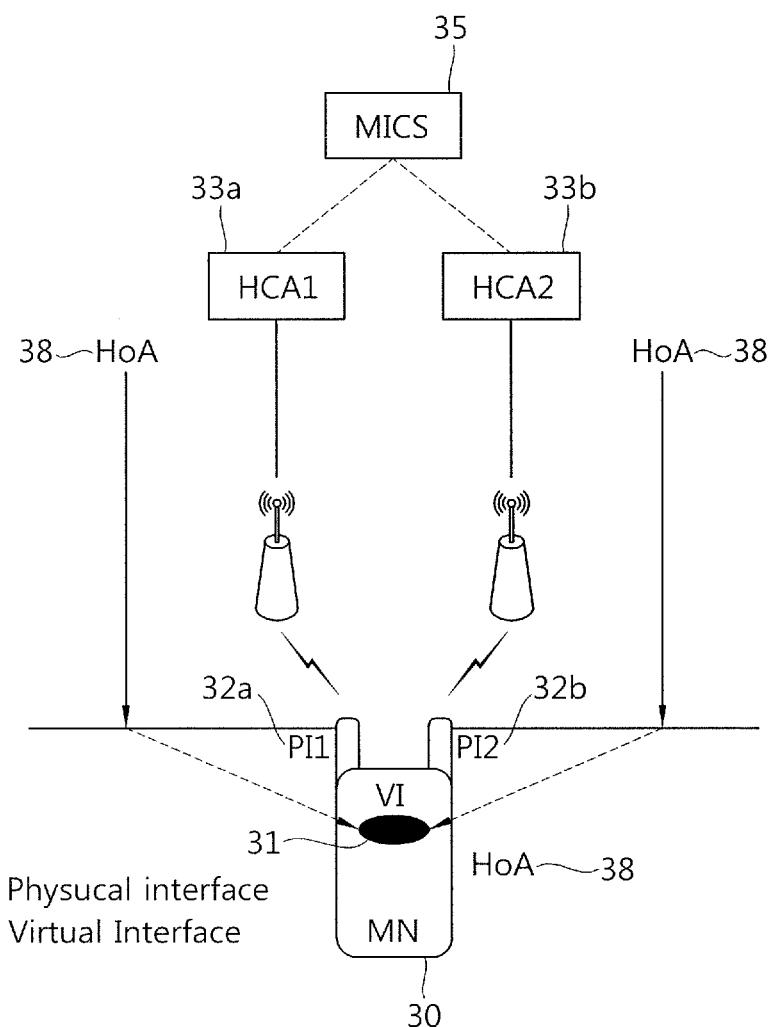
FIG. 3 shows an example of the allocation of HoAs to a virtual interface in accordance with the present invention.

FIG. 3 shows an example of the allocation of HoAs to a virtual interface in accordance with the present invention.

Referring to FIG. 3, an MN 30 is first registered with an MICS 35 through one, for example, a PI1 32a of a plurality of Physical Interfaces (PIs) owned by the MN 30. The MN 30 obtains a HoA 38 through a HCA1 33a, and a Virtual Interface (VI) 31 manages the HoA 38. Next, if the MN 30 is registered with the MICS 35 through another physical interface, for example, a PI2 32b, the MN 30 can inform a HCA2 33b of the HoA 38 because the MICS 35 knows that the HoA 38 allocated to the MN 30. That is, it can be seen that the MN 30 receives the same HoA 38 from the VI 31 through a plurality of physical interfaces.

(2) MN Identifier (ID)

In an AIMS system, the ID of an MN is defined as a list of data link layer (layer-2: L2) addresses owned by the MN. Accordingly, when binding information on a terminal is managed by an MICS and a HCA, an L2 address is utilized as the identifier of the terminal. In an environment in which multiple interfaces are supported, however, the L2 addresses may be utilized for various purposes. A more differentiated MN-ID may be used to identify a terminal. For example, a Network Access Identifier (NAI) that is used a lot in the existing Internet Protocol may be used as the ID of an MN. The NAI is a standard method for identifying a user who requests access to a network in communication. A standard grammar has a form "user@realm", and standards thereof include RFC 2486 and RFC 4282.

(3) Scheme for Managing Binding Information in MICS

An MICS manages a Global Binding Table (GBT) and a session information table.

TABLE 1

| No. | MN-ID (NAI) | HoAv4 | HoAV6 | Binding List | | | | | |
|---|---|---|---|---|---|---|---|---|---|
| | | | | B-ID | Type | L2 Address | CoA (HCA addr.) | Default | Lifetime |
| 1 | mn1@kt.com | 229.254.197.56 | — | 1.1 | WL | 0009.3d13.4acd | 210.107.131.11 | | 200 s |
| | | | | 1.2 | 3G | IMSI Number-1 | 210.107.131.12 | 0 | 250 s |
| | | | | 1.3 | WB | 000e.0c66.d765 | 210.107.131.13 | | 300 s |
| 2 | mn2@skt.com | 220.16.184.77 | 3ffe:ef11:1::21 | 2.1 | WL | IMSI Number-2 | 101.200.21.87 | 0 | 300 s |
| | | | | 2.2 | 3G | 001e1.e010.111f | 101.200.21.88 | | 500 s |
| 3 | mn3@skt.com | — | 4c1f:432c:3::12d | 2.3 | WB | 000c, 6cbc.b7fa | 101.200.21.89 | 0 | 240 s |

Table 1 shows an example of an extended Global Binding Table (GBT) structure that is managed within an MICS. Referring to Table 1, an MN-ID indicates the ID of an MN, and an NAI is used as the MN-ID. HoAv4 and HoAv6 indicate whether a HoA is allocated to IPv4 and IPv6 or not. HoA may have a different value according to an IPv4 or IPv6 version. A HoA may be allocated to at least one of IPv4 and IPv6 in relation to each MN-ID. Meanwhile, a binding list includes a B-ID, a type, an L2 address, a CoA (HCA address), default, and a lifetime. The B-ID is a binding ID allocated by an MN after the MN finishes a registration process for each of interfaces owned by the MN. The type indicates an access type for each B-ID of an MN. The L2 address is the address of the data link layer of an MN. The CoA (HCA address) is a CoA regarding a current connection point of an MN in a mobile IP network, and it may indicate a HCA address. Furthermore, the default indicates whether or not a specific flow has been set so that the specific flow is transmitted toward an MN as predetermined binding information. That is, if a specific flow has not been set so that it is transmitted toward an MN as predetermined binding information, the default value of binding information on which the flow is transmitted indicates O. For example, if there is no predetermined specific binding information on a specific flow in relation to an MN having an MN-ID of mn1@kt.com, the default value indicates O. In this case, the MN receives the corresponding flow through a 3G interface. The lifetime indicates the time when each of pieces of information on a corresponding binding list is treated validly.

TABLE 2

| X-ID | X-HoAv4 | Y-ID | Y-HoAv4 | Session Information | | | Lifetime |
|---|---|---|---|---|---|---|---|
| | | | | A pair of 5-tuples | X-HCA(CoA) | Y-HCA(CoA) | |
| mn1@kt.com | 229.254.197.56 | mn5@kt.com | 211.12.214.82 | <X, Y, s1, t1, tcp><br><Y, X, t1, s1, tcp> | 210.107.131.11 | 101.200.21.88 | 300 s |
| | | | | <X, Y, s2, t2, udp><br><Y, X, t2, s2, udp> | 210.107.131.12 | 101.200.21.89 | 210 s |

Table 2 shows an example of a session information table. Referring to Table 2, ID information on two MNs that participate in a session are indicated by an X-ID and a Y-ID, and pieces of HoA information on the MNs are indicated in X-HoAv4 and Y-HoAv4. In session information, information on two interactive flows participating in a session is indicted in the form of a 5-tuple pair. An X-HCA (CoA) and a Y-HCA (CoA) indicate two pieces of HCA information on which tunneling for each flow session is performed. The lifetime indicates the time when corresponding session information is valid. The information configured in Table 2 is a record on all sessions that are being served through an AIMS system. Table 2 shows an example in which two MNs open an IPv4 session. For example, if two MNs open an IPv6 session, the session information table may configure HoAs for the IPv6 session. In this case, in Table 2, the item X-HoAv4 may be replaced with X-HoAv6, the item Y-HoAv4 may be replaced with Y-HoAv6, and the values of the items may also be changed.

(4) Binding Management Scheme in HCA

TABLE 3

| No | MN-ID | MN HoA | L2 ID Type | L2 ID Address | HCA's NIC ID | Lifetime |
|---|---|---|---|---|---|---|
| 1 | mn1@kt.com | 229.254.197.56 | WB | 000e.0c66.d755 | 1111.1111.1111 | 70 s |
| 2 | mn2@kt.com | 220.16.184.77 | WB | 00c0.9f04.0f90 | 2222.2222.2222 | 200 s |
| 3 | mn3@kt.com | 3ffe:ef11:1::21 | WB | 01f1.11d1.098b | 3333.3333.3333 | 300 s |

Table 3 shows an example of a MN Binding Table (MBT) in accordance with the present invention MBT. Referring to Table 3, an MN-ID indicates the ID of an MN, and a NAI is used as the MN-ID. An MN HoA indicates the HoA of an MN. The type of "L2 ID" indicates the access type of an MN, and the address of "L2 ID" indicates the address of the data link layer of an MN. An "HCA's NIC ID" indicates the ID of a network interface card, that is, the communication module of a HCA. A lifetime indicates the time when corresponding information is valid. The MBT in accordance with the present invention is characterized in that an NAI is used as an MN-ID, as compared with an MBT used in the existing AIMS system.

TABLE 4

| No | (Corresponding) MN-ID | MN HoA (Destination) | Flow Selector | Forwarding per Flow HCA | Lifetime |
|---|---|---|---|---|---|
| 1 | mn4@kt.com | 163.152.45.76 | <*, IP1, *, 21, *> | 101.200.21.87 | 100 s |
|   |   |   | <*, *, *, *, TCP> | 101.200.21.88 | 210 s |
|   |   |   | default | 101.200.21.87 | 300 s |
| 2 | mn5@kt.com | 211.12.214.82 | <*, IP3, *, 25, *> | 210.107.131.12 | 80 s |
|   |   |   | <*, *, *, *, TCP> | 210.107.131.13 | 120 s |
|   |   |   | default | 210.107.131.12 | 300 s |

Table 4 shows an example of a Packet Forwarding Table (PFT) that is managed in a HCA in accordance with the present invention. Referring to Table 4, a (corresponding) MN-ID indicates the ID of an MN that receives a signal. In other words, the (corresponding) MN-ID may mean the ID of an MN2 that performs communication with an MN1, for example, from a viewpoint of the MN1 (i.e., an MN that sends a signal), and an NAI is used as the (corresponding) MN-ID. In this case, the MN2 may also be called a Corresponding Node (CN). An MN HoA (destination) indicates the HoA of an MN that receives a signal. For example, an MN HoA (destination) may mean the HoA of the MN2 in the above example. A HCA performs determination for packet forwarding depending on a flow selector. In other words, if a HCA has a flow to be forwarded now, a HCA performs packet forwarding to a specific HCA that is associated with a matched flow selector by comparing the corresponding flow with a flow selector list registered with a PFT.

(5) Registration Process Through Multiple Interfaces

Figure 4:
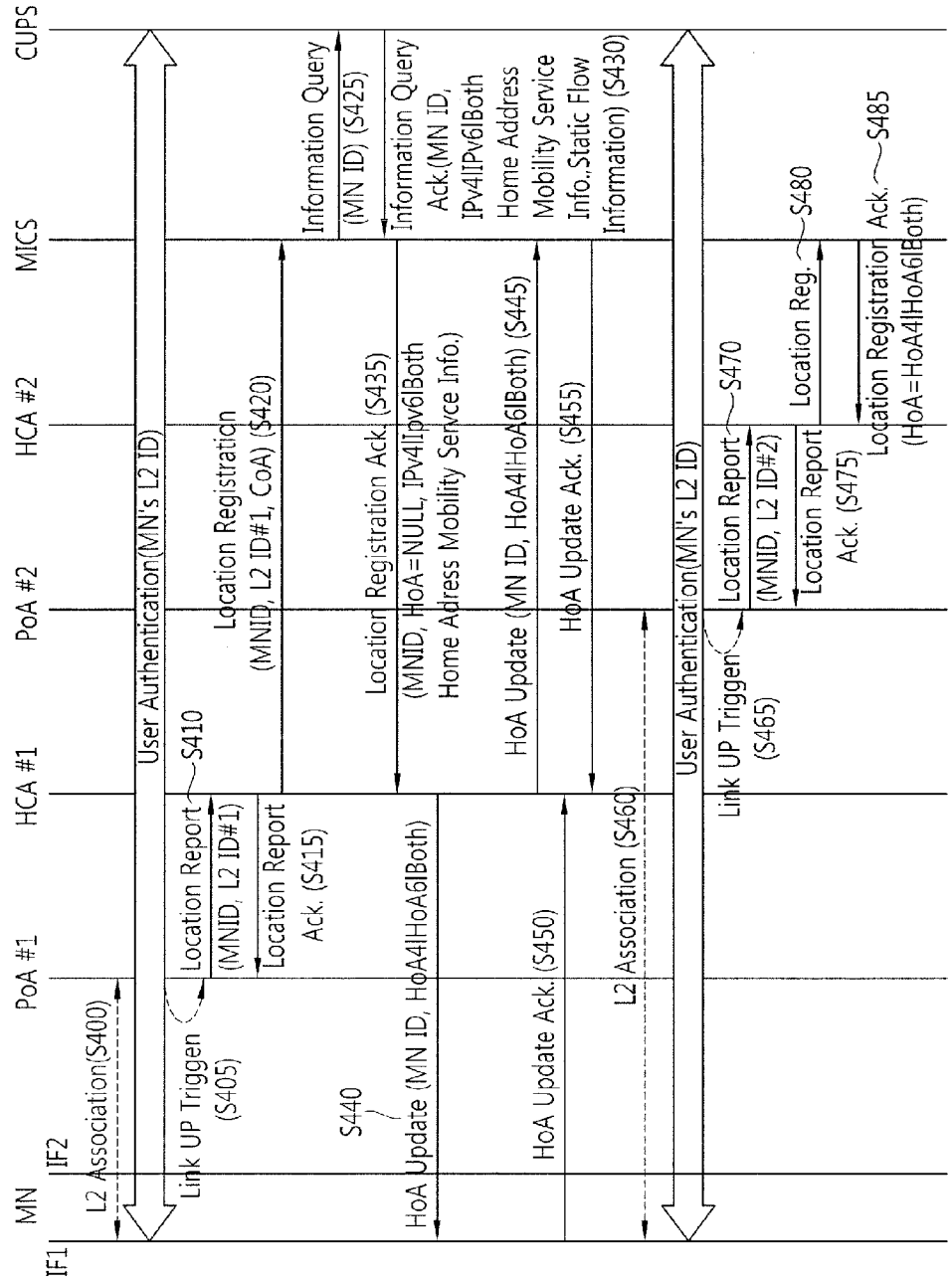
FIG. 4 shows a process in which an MN having two interfaces is registered with a HCA and an MICS through the respective interfaces in accordance with an example of the present invention.

FIG. 4 shows a process in which an MN having two interfaces is registered with a HCA and an MICS through the respective interfaces in accordance with an example of the present invention.

Referring to FIG. 4, an MN sets up an L2 association with an access network (more particularly, a PoA#1, that is, a Point of Attachment (PoA) for an access network to which the MN will gain access) through an Interface 1 (IF1) at step S400. A process of the MN setting up the L2 association through the IF1 includes a user authentication procedure for checking whether a user who has subscribed to each service provider network has an access right or not. Here, the user authentication procedure is performed by the exchange of pieces of authentication information between the MN and a Converged User Profile Servers (CUPS) which manages a subscriber profile for the access network. The CUPS is extension technology of an AAA server, and the ID of an MN used in the CUPS is an NAI. The NAI of the MN is previously registered with the CUPS for user identity. After the user authentication procedure, the PoA#1 can know the NAI of the MN.

After the L2 association process including the user authentication procedure is completed through the IF1 of the MN, an L2 link up trigger that informs new link setup is generated in the L2 layer of the PoA#1 at step S405. The L2 link up trigger is converted into an MIH link up trigger by the Media Independent Handover (MIH) layer of the PoA#1.

The PoA#1 sends a location report message for initiating a network-based registration procedure on the basis of the MIH link up trigger to a HCA#1, that is, the HCA of a corresponding access network, at step S410. The location report message includes the ID of the MN and an L2 ID#1, that is, an L2 ID for the IF1. After sending the location report message to the HCA#1 or simultaneously with the transmission of the location report message (before the transmission according to circumstances), the PoA#1 sends at least one of an IPv4 Router Advertisement (RA) message and an IPv6 RA message to the MN. The IPv4 RA message and the IPv6 RA message are messages that the PoA#1 has received them from the HCA#1 and stored in an RA cache. The MN sets at least one of an IPv4 default gateway address (IPv4, MAC) and an IPv6 default gateway address (IPv6, MAC) according to a protocol stack, now being activated by the MN, based on the received RA messages. The set default gateway address is used as a default gateway address for packets that go out from the MN through the IF1.

The HCA#1 that has received the location report message sends a location report Ack. message to the PoA#1 at step S415. Next, the HCA#1 extracts an L2 ID#1, that is, information on the L2 ID for the IF1 of the MN, and searches an MN Binding Table (MBT), managed by the HCA#1, for a corresponding entry. In the case of initial registration, since there is no binding entry for the MN, the HCA#1 generates a new entry and records the ID of the MN, an L2 ID#1, that is, information on the L2 ID for the IF1 of the MN, the type of access network, lifetime, and a Network Interface Card (NIC) ID of the HCA#1.

After a new entry is generated, the HCA#1 sends a location registration message to the MICS in order to perform an initial process of registering the MN with the MICS at step S420. The location registration message includes the ID of the MN, the L2 ID#1, that is, the L2 ID of the IF1, and information on a CoA#1, that is, the IP address of the HCA#1. If a core network where the HCA#1 and the MICS are placed is IPv4, the CoA#1, that is, the address of the HCA#1, is an IPv4 address. If the core network is IPv6, the CoA#1 is an IPv6 address.

The MICS that has received the location registration message extracts the ID of the MN, the L2 ID#1, that is, the L2 ID of the IF1, and the information on the CoA#1 and searches a Global Binding Table (GBT), managed by the MICS, for a binding entry that corresponds to the ID of the MN. If, as a result of the search, there is no corresponding binding entry, the MICS determines it as an initial registration situation and sends an information query message to the CUPS at step S425.

In response to the information query message of the MICS, the CUPS sends an information query Ack. message to the MICS at step S430. Here, the CUPS also sends the ID of the MN and information on whether the MN requires IPv4 home address mobility service or IPv6 home address mobility service or whether the MS requires both the services, that is, IPv4/IPv6 home address mobility service information. Furthermore, the CUPS also sends predetermined static flow binding information on the MN. The static flow binding information may mean a predetermined static distribution rule for a specific flow. The static flow binding information may be previously set according to the criteria of a terminal/user or a rule decided by an Internet Service Provider (ISP).

Next, the MICS generates a new binding entry for the MN to be registered within the GBT and records the pieces of information (e.g., all information lists about the MN and IPv4/IPv6 home address mobility information), received from the CUPS at step S430, and the L2 ID#1 and the information on a CoA#1, received from the HCA#1 at S420, on the binding entry.

The MICS sends a location registration Ack. message to the HCA#1 at step S435. At this time, the MICS also sends HoA information. Since the MICS does not have HoA information at the time of initial registration, the MICS sets a HoA value to 'NULL' and sends the HoA information. Furthermore, the MICS sends the IPv4/IPv6 home address mobility service information, that is, information received from the CUPS.

When receiving the location registration Ack. message in which the HoA information is set to 'NULL', the HCA#1 determines that the MN is performing an initial registration procedure. In this case, the HCA#1 requests the allocation of an IPv4 address and/or IPv6 address to be used as the HoA of the MN from a DHCP server which manages the access network and records the address on the binding entry for the MN within the MBT. For example, if the HCA#1 needs IPv4 home address mobility service, it may receive an IPv4 address from DHCPv4 and record the IPv4 address on the binding entry for the MN within the MBT as IPv4 HoA information. For another example, if the HCA#1 needs IPv6 home address mobility service, it may receive an IPv6 address from DHCPv6 and record the IPv6 address on the binding entry for the MN within the MBT as IPv6 HoA information.

In order to notify the HoA information allocated by the DHCP server, the HCA#1 sends a HoA update message to the MN at step S440. The HoA update message includes at least one of the IPv4 HoA information and the IPv6 HoA information.

Furthermore, in order to notify the HoA information allocated by the DHCP server, the HCA#1 sends a HoA update message to the MICS at step S445. The HoA update message includes at least one of the IPv4 HoA information and the IPv6 HoA information.

The step S440 is illustrated as being performed prior to the step S445, but this is only illustrative. The step S445 may be performed prior to the step S440 or both the steps S445 and 440 may be performed at the same time.

The MN sets at least one of the IPv4 HoA address and IPv6 HoA address as its own address based on the HoA update message received from the HCA#1 at step S440 and sends a HoA update Ack. message to the HCA#1 at step S450.

The MICS records at least one of the IPv4 HoA information and the IPv6 HoA information on the binding entry for the MN within the GBT based on the HoA update message received from the HCA#1 at step S445 and sends a HoA update Ack. message to the HCA#1 at step S455.

The step S450 is illustrated as being performed prior to the step S455, but this is only illustrative. The step S455 may be performed prior to the step S450 or both the steps S455 and 450 may be performed at the same time.

The MN sets up an L2 association with an access network (more particularly, a PoA#2, that is, a Point of Attachment (PoA) for an access network to be accessed) through an Interface 2 (IF2) at step S460. A process of the MN setting up the L2 association through the IF2 includes a user authentication procedure for checking whether a user who has subscribed to each service provider network has an access right or not by authenticating the user. Here, the user authentication procedure is performed by the exchange of pieces of authentication information between the MN and a CUPS that manages a subscriber profile for the access network. The ID of an MN used in the CUPS is an NAI. After the user authentication procedure, the PoA#2 can know the NAI of the MN.

After the L2 association process including the user authentication procedure is finished through the IF2 of the MN, an L2 link up trigger that informs new link setup is generated in the L2 layer of the PoA#2 at step S465. The L2 link up trigger is converted into an MIH link up trigger by the Media Independent Handover (MIH) layer of the PoA#2.

The PoA#2 sends a location report message for initiating a network-based registration procedure on the basis of the MIH link up trigger to a HCA#2, that is, the HCA of a corresponding access network at step S470. The location report message includes the ID of the MN and an L2 ID#2, that is, an L2 ID for the IF2. After sending the location report message to the HCA#2 or at the same time with the transmission of the location report message (or before the transmission of the location report message according to circumstances), the PoA#2 sends at least one of an IPv4 Router Advertisement (RA) message and an IPv6 RA message to the MN. The IPv4 RA message and the IPv6 RA message are messages that the PoA#2 have received them from the HCA#2 and stored them in an RA cache. The MN sets at least one of an IPv4 default gateway address (IPv4, MAC) and an IPv6 default gateway address (IPv6, MAC) according to a protocol stack, now being activated by the MN, based on the received RA messages. The set default gateway address is used as a default gateway address for packets that go out from the MN through the IF2.

The HCA#2 that has received the location report message sends a location report Ack. message to the PoA#2 at step S475. Next, the HCA#2 extracts the L2 ID of the MN and searches an MN Binding Table (MBT), managed by the HCA#2, for a corresponding binding entry. Here, since there is a binding entry for the MN, the HCA#2 records the ID of the MN, the L2 ID#2, that is, information on the L2 ID for the IF2 of the MN, the type of access network, lifetime, and the Network Interface Card (NIC) ID of the HCA#2 on the binding entry.

In order to perform a process of registering the MN with the MICS, the HCA#2 sends a location registration message to the MICS at step S480. The location registration message includes the ID of the MN, an L2 ID#2, that is, the L2 ID of the IF2, and information on a CoA#2, that is, the IP address of the HCA#2. If a core network in which the HCA#2 and the MICS are placed is IPv4, the CoA#2, that is, the address of the HCA#2, is an IPv4 address. If the core network is IPv6, the CoA#2 is an IPv6 address.

The MICS that has received the location registration message extracts the ID of the MN, an L2 ID#2, that is, the L2 ID of the IF2, and the information on the CoA#2 and searches a Global Binding Table (GBT), managed by the MICS, for a binding entry for the ID of the MN. If, as a result of the search, there is a corresponding binding entry, the MICS records the L2 ID#2 and the information on the CoA#2, received from the HCA#2 at step S480, on the binding entry. In this case, the MICS may not send an information query message to a CUPS.

The MICS sends a location registration Ack. message to the HCA#2 at step S485. In this case, the MICS sends the HoA information to the HCA#2. Accordingly, in this case, the HCA#2 may not request an IPv4 address and/or an IPv6 address to be used as the HoA of the MN from the DHCP server and may not perform HoA update for the MN and the MICS.

(6) Process of Accessing Another HCA of Specific Interface in Multi-Connection State If an MN performs re-access from an already accessed HCA to another HCA through a specific interface, the MN performs a location information update procedure, which is generally performed like the initial registration procedure for the MN. However, a re-access procedure is a control procedure for a situation in which an MN that has finished an initial registration procedure enters a new access network, and thus a HoA allocation and notification procedure using a DHCP is not performed. Furthermore, an information query procedure is not performed because an MICS receives all information lists for an MN and information on IPv4/IPv6 home address mobility services from a CUPS and manages them. Furthermore, when user authentication is performed, authentication technology using a localized or proactive method may be used. Furthermore, if an MICS transfers a location registration Ack. message to a HCA in an initial registration procedure, the MICS transfers information on IPv4/IPv6 home address mobility services. However, in a re-access (or handover) process, the MICS has only to transfer at least one of IPv4 information and IPv6 information as HoA information. Furthermore, even in a re-access (handover) process, another connected interface in addition to an interface to which an MN attempts to re-access (or handover) still maintains connection setup. This is described in detail with reference to the accompanying drawings.

Figure 5:
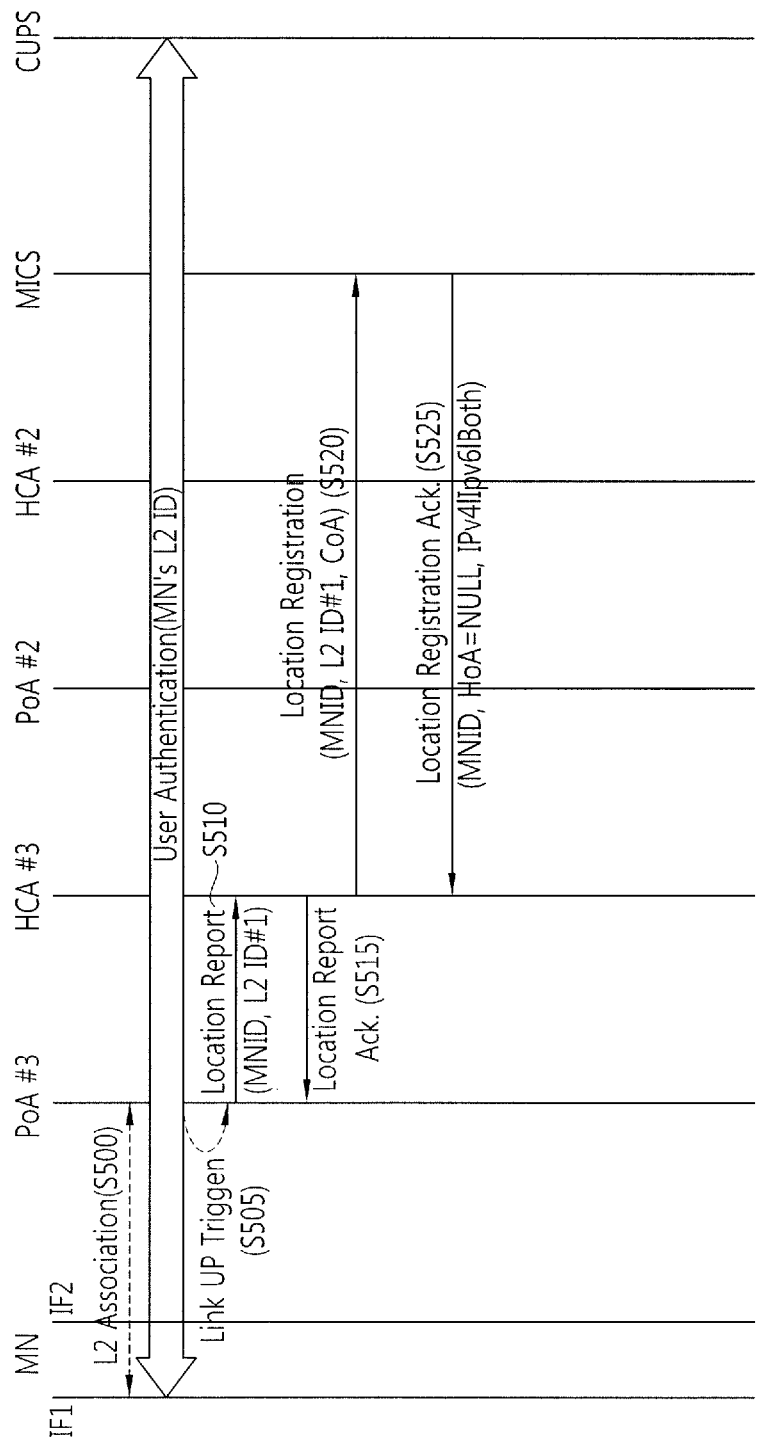
FIG. 5 shows a process in which an MN is registered with another HCA through a specific interface during multi-connection in accordance with an example of the present invention.

FIG. 5 shows a process of an MN re-accessing another HCA through a specific interface during multi-connection in accordance with an example of the present invention. FIG. 5 shows an example in which an MN re-accesses a HCA#3 through an IF1. Another interface (i.e., an IF2) in addition to the IF1 to which the MN attempts to re-access can still maintain connection setup.

Referring to FIG. 5, the MN sets up an L2 association with an access network (more particularly, an PoA#3, that is a Point of Attachment (PoA) for an access network to be accessed) to be accessed through an Interface 1 (IF1) at step S500. A process of the MN setting up the L2 association through the IF1 includes a user authentication procedure for checking whether a user who has subscribed to each service provider network has an access right or not. Here, the user authentication procedure is performed by the exchange of pieces of authentication information between the MN and a CUPS that manages a subscriber profile for the access network. Here, when user authentication is performed, authentication technology using a localized or proactive method may be used. The ID of the MN used in the CUPS is an NAI. After the user authentication procedure, the PoA#3 can know the NAI of the MN.

After the L2 association process including the user authentication procedure is finished through the IF2 of the MN, an L2 link up trigger that informs new link setup is generated in the L2 layer of the PoA#3 at step S505. The L2 link up trigger is converted into an MIH link up trigger by the Media Independent Handover (MIH) layer of the PoA#3.

The PoA#3 sends a location report message for initiating a network-based registration procedure to a HCA#3, that is, the HCA of the corresponding access network on the basis of the MIH link up trigger at step S510. The location report message includes the ID of the MN and an L2 ID#1, that is, an L2 ID for the IF1. After sending the location report message to the HCA#3 or at the same time with the transmission of the location report message (or before the transmission of the location report message according to the circumstances), the PoA#3 sends at least one of an IPv4 Router Advertisement (RA) message and an IPv6 RA message to the MN. The IPv4 RA message and the IPv6 RA message are messages that the PoA#3 have received them from the HCA#3 and stored them in an RA cache. The MN sets at least one of an IPv4 default gateway address (IPv4, MAC) and an IPv6 default gateway address (IPv6, MAC) according to a protocol stack, now being activated by the MN, based on the received RA messages. The set default gateway address is used as a default gateway address for packets that go out from the MN through the IF1.

The HCA#3 that has received the location report message sends a location report Ack. message to the PoA#3 at step S515. Next, the HCA#3 extracts the L2 ID of the MN and searches an MN Binding Table (MBT), managed by the MN, for a binding entry. Here, since there is a binding entry for the MN, the HCA#2 records the ID of the MN, an L2 ID#1, that is, information on the L2 ID of the IF1 of the MN, the type of access network, lifetime, and the Network Interface Card (NIC) ID of the HCA#3 on the binding entry.

In order to perform a procedure for registering the MN with an MICS, the HCA#3 sends a location registration message to the MICS at step S520. The location registration message includes the ID of the MN, an L2 ID#1, that is, the L2 ID of the IF2, and information on a CoA#3, that is, the IP address of the HCA#3. If a core network in which the HCA#3 and the MICS are placed is IPv4, the CoA#3, that is, the address of the HCA#3 is an IPv4 address. If the core network is IPv6, the CoA#3 is an IPv6 address.

The MICS that has received the location registration message extracts the ID of the MN, the L2 ID#1, that is, the L2 ID of the IF2, and the information on the CoA#3 and searches a Global Binding Table (GBT), managed by the MICS, for a binding entry corresponding to the ID of the MN. If, as a result of the search, the binding entry is retrieved, the MICS records the L2 ID#1 and the information on the CoA#3, received from the HCA#3 at step S520, on the binding entry. In this case, the MICS may not send an information query message to a CUPS.

The MICS sends a location registration Ack. message to the HCA#3 at step S525. In this case, the MICS also sends HoA information to the HCA#3. Accordingly, in this case, the HCA#3 may not request an IPv4 address and/or an IPv6 address to be used as the HoA of the MN from a DHCP server and also may not perform HoA update for the MN and the MICS.

2. Stack Architecture and Flow Management Scheme of Mobile Node (MN)

Figure 6:
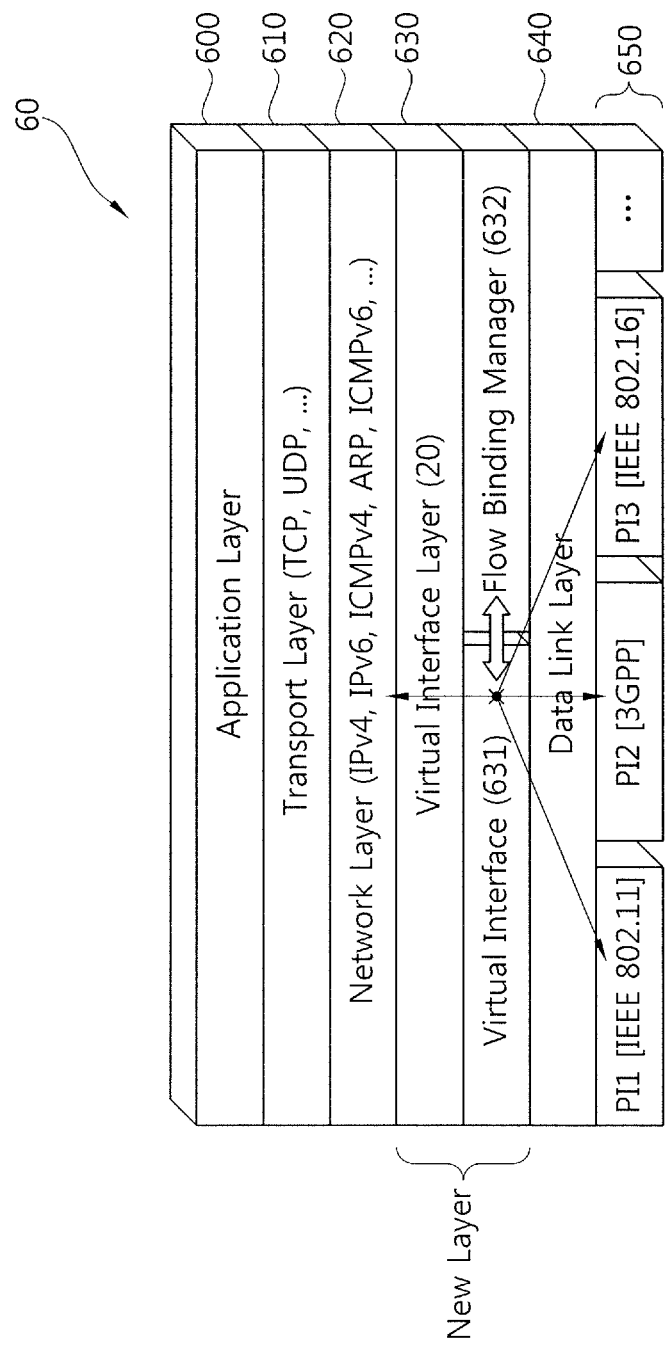
FIG. 6 shows an example of the protocol stack architecture of an MN in accordance with the present invention.

FIG. 6 shows an example of the protocol stack architecture of an MN in accordance with the present invention.

Referring to FIG. 6, the protocol stack 60 of an MN includes an application layer 600, a transport layer 610, a network layer 620, a virtual interface layer 630, a data link layer 640, and physical interface layers 650. The physical interface layers 650 may be classified into a PI1, a PI2, a PI3, etc.

The virtual interface layer 630 newly added in the present invention is embodied between the network layer 620 and the data link layer 640, and it includes a virtual interface 631 and a flow binding manager 632.

The virtual interface 631 is a virtual network interface through which packets downloaded from a higher layer and packets uploaded from a lower layer pass. Accordingly, in a higher layer, the interfaces of the MN are seen as one. In this case, the MN can solve several problems occurring when handover is performed between heterogeneous access networks, for example, a problem in that the same address is allocated to several interfaces.

The flow binding manager 632 functions to determine whether packets downloaded from a higher layer to the virtual interface 631 will be actually transferred to what physical interface. In order to efficiently perform this determination, the flow binding manager 632 manages the following flow binding list.

TABLE 5

| Flow ID | Priority | Flow Selector | Outbound Interfaces | Type | Lifetime |
|---|---|---|---|---|---|
| 4 | 4 | (*, IP2, *, 80, *) | WL→3G→WB | Static | ∞ |
| 3 | 3 | (*, *, *, 150, UDP) | 3G→WL→WB | Static | ∞ |
| 2 | 2 | (*, FF02::/64 , *, *, *) | WL, 3G, WB | Default | ∞ |
| 1 | 1(The lowest) | (*, *, *, *, *) | 3G→WL→WB | Default | ∞ |

Table 5 shows an example of the flow binding list of an MN1. Here, the MN1 is a mark for distinguishing it from an MN2 to be described later, and both the MN1 and the MN2 are a kind of MN. Referring to Table 5, the flow binding list includes entry information on whether filtered packets will be transmitted to what physical interfaces depending on each flow selector and includes a flow ID, priority, a flow selector, outbound interfaces, a type, and lifetime for each entry. When there is a packet to be externally transmitted, the MN1 first refers to the flow binding list and determines whether a corresponding packet will be transmitted to what physical interface by referring to the outbound interfaces while referring the outbound interfaces from the highest priority information on the flow binding list. Table 5 includes four pieces of flow binding information. Two lowest entries in the flow binding list are basically included when a terminal is driven, and they include information on a physical interface for packets that are not filtered in relation to flow selectors having higher priority and processing information on packets that are transmitted to an IPv6 link local broadcast address. Meanwhile, two upper entries in the flow binding list are determined according to the criteria of a terminal itself. The following flow distribution can occur based on the two pieces of upper flow binding information.

Figure 7:
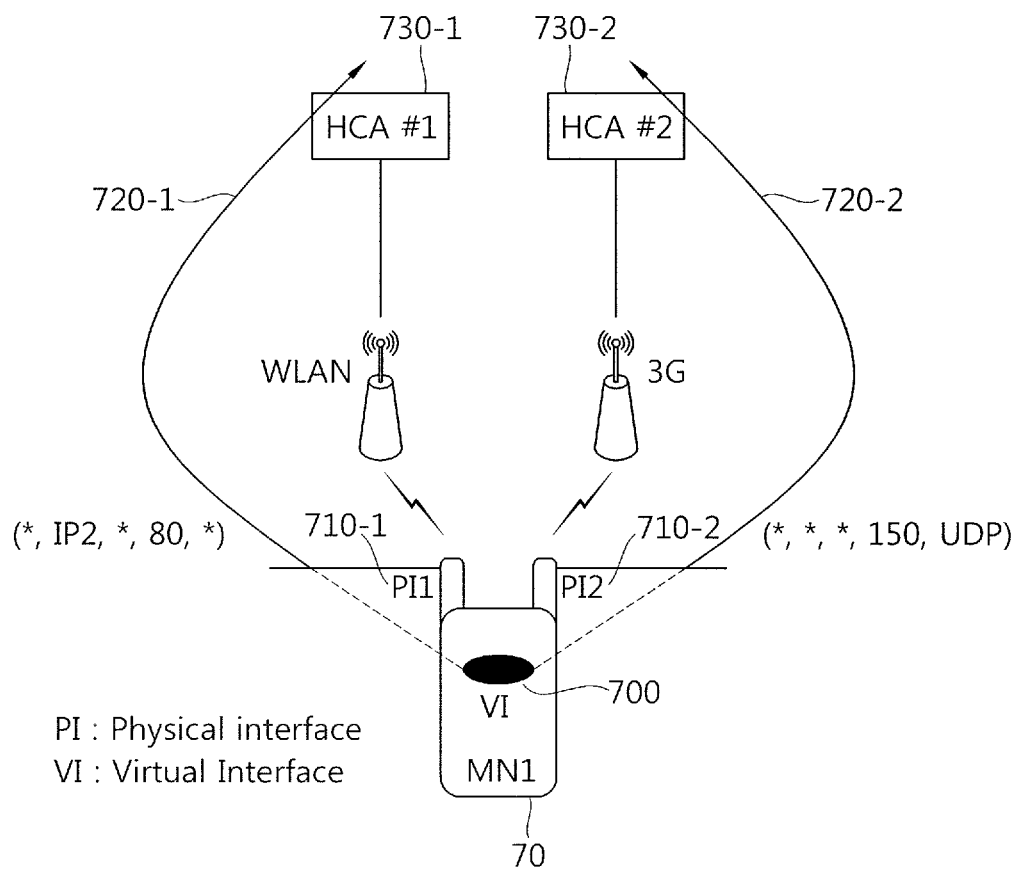
FIG. 7 shows an example of the flow distribution of an MN1 in accordance with the present invention.

FIG. 7 shows an example of the flow distribution of the MN1 in accordance with the present invention.

Referring to FIG. 7, an MN1 70 includes a Virtual Interface (VI) 700, a Physical Interface #1 (PI1) 710-1, and a Physical Interface #2 (PI2) 710-2. Two flows 720-1 and 720-2 are distributed through the PI1 710-1 and the PI2 710-2 from the VI 700 of the MN1 70 and then transmitted to a HCA#1 730-1 and a HCA#2 730-2, respectively. In this example, according to Table 5, the flow 720-1 corresponds to a case where the flow ID is 4 and the flow 720-2 corresponds to a case where the flow ID is 3. As shown in the outbound interfaces of Table 5, communication between the MN1 70 and the HCA#1 730-1 through which the flow 720-1 is transmitted is performed over a WLAN, and communication between the MN1 70 and the HCA#2 730-2 through which the flow 720-2 is transmitted is performed over 3G.

Meanwhile, if a corresponding MN communicating with the MN1 70 is an MN2, the flow binding list of the MN2 may be a flow binding list, such as that shown in Table 6 below. The flow distribution of the MN2 may have a flow distribution, such as that shown in FIG. 8. The MN2 may also be called a Corresponding Node (CN) from a viewpoint of the MN1.

TABLE 6

| Flow ID | Priority | Flow Selector | Outbound Interfaces | Type | Lifetime |
|---|---|---|---|---|---|
| 4 | 4 | (*, IP2, *, 80, *) | WL→3G | Static | ∞ |
| 3 | 3 | (*, *, *, 150, UDP) | 3G→WL | Static | ∞ |
| 2 | 2 | (*, FF02::/64, *, *, *) | WL, 3G | Default | ∞ |
| 1 | 1(The lowest) | (*, *, *, *, *) | 3G→WL | Default | ∞ |

Table 6 shows an example of the flow binding list of the MN2.

Referring to Table 6, the flow binding list includes entry information on whether filtered packet will be transmitted to what physical interface depending on each flow selector and includes a flow ID, priority, a flow selector, outbound interfaces, a type, and lifetime for each entry. A description of the flow binding list of Table 6 is the same as that of the flow binding list of Table 5 except that the MN2 replaces the MN1.

Figure 8:
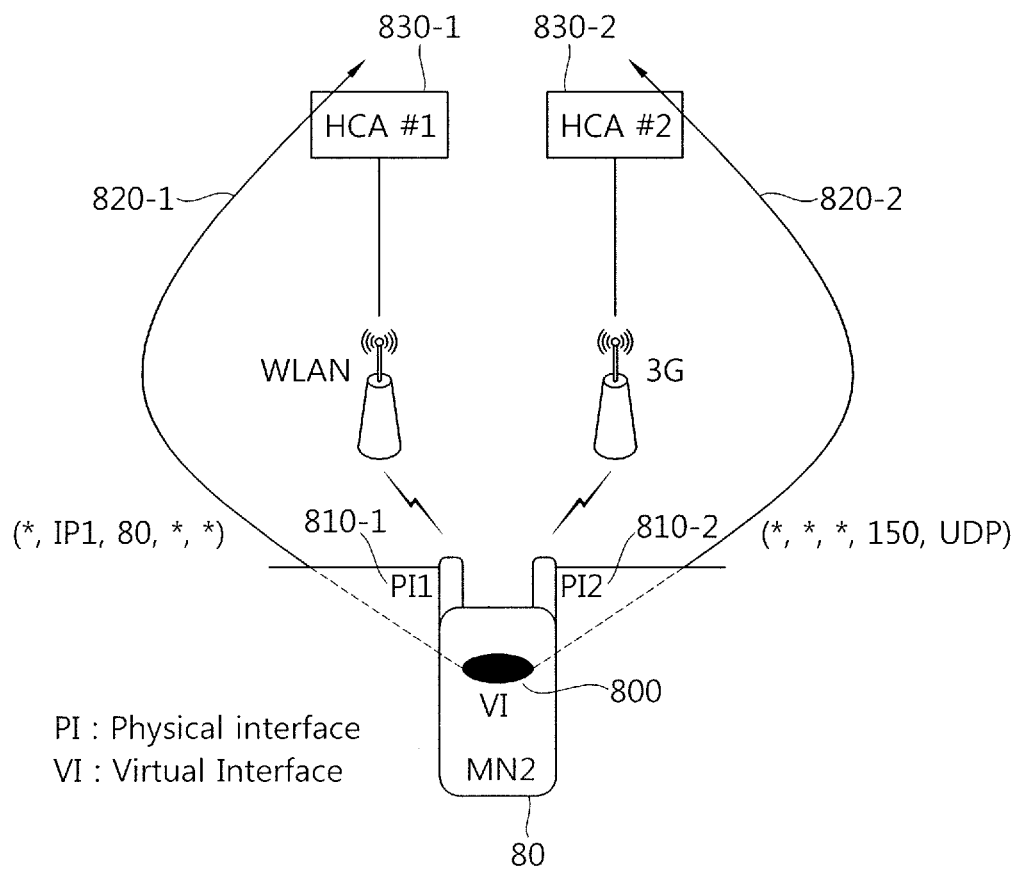
FIG. 8 shows an example of the flow distribution of an MN2 in accordance with the present invention.

FIG. 8 shows an example of the flow distribution of the MN2 in accordance with the present invention.

Referring to FIG. 8, the MN2 80 includes a Virtual Interface (VI) 800, a Physical Interface #1 (PI1) 810-1, and a Physical Interface #2 (PI2) 810-2. Two flows 820-1 and 820-2 are distributed through the PI1 810-1 and the PI2 810-2 from the VI 800 of the MN2 80 and then transmitted to a HCA#3 830-1 and a HCA#4 830-2, respectively. In this example, according to Table 6, the flow 820-1 corresponds to a case where the flow ID is 4 and the flow 820-2 corresponds to a case where the flow ID is 3. As shown in the outbound interfaces of Table 6, communication between the MN2 80 and the HCA#3 830-1 through which the flow 820-1 is transmitted is performed over a WLAN, and communication between the MN2 80 and the HCA#4 830-2 through which the flow 820-2 is transmitted is performed over 3G.

3. Flow Management Scheme of Mobility Information Control Server (MICS) and Handover Control Agent (HCA)

An MICS, like an MN, manages its own flow binding table. Here, the MN manages flow information on an outbound flow, whereas the MICS manages flow information on the inbound flow of each MN.

Figure 9:
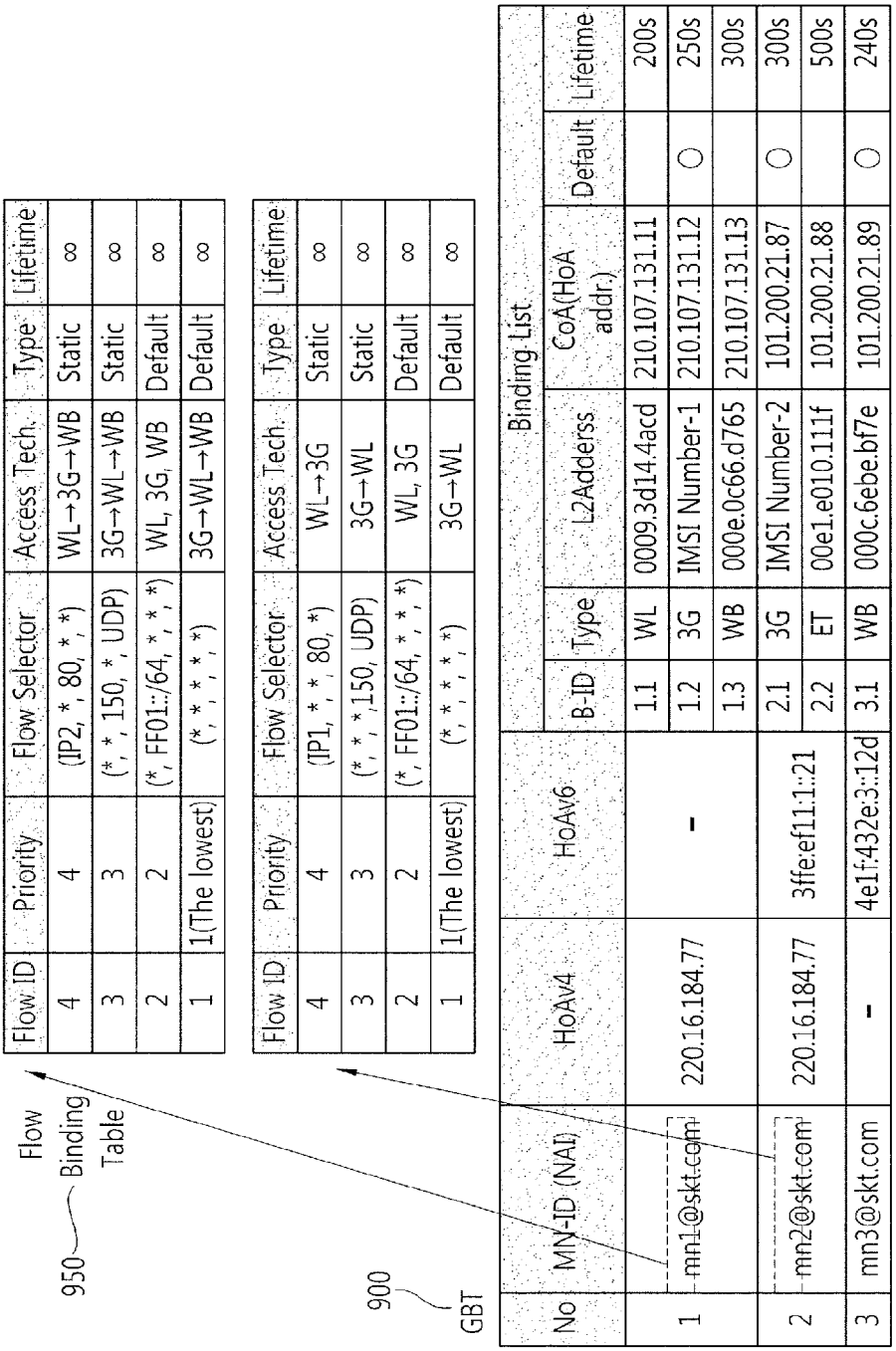
FIG. 9 shows an example of a GBT and a flow binding table, associated with the GBT, which are managed in an MICS in accordance with the present invention.

FIG. 9 shows an example of a GBT 900 and a flow binding table 950, associated with the GBT, which are managed in an MICS in accordance with the present invention. FIG. 9 shows an example of a flow binding table that corresponds to the flow binding lists for the MN1 and the MN2 shown in Table 5 and Table 6.

Referring to FIG. 9, the GBT 900 managed in the MICS includes information on all MNs now registered with the MICS. Furthermore, the MICS has the flow binding table 950 for each of the MNs. The flow binding table 950 is associated with the GBT 900. The flow binding table 950 is similar to a flow binding list that is managed by an MN, but the flow binding table 950 managed in the MICS includes an item 'access tech.' not an item 'outbound interfaces'. That is, the flow binding table 950 managed in the MICS includes information on whether an inbound flow toward each MN will use what access technology (i.e., an access network type) after being filtered by a flow selector. Furthermore, the MICS may determine whether packets toward an MN will be transmitted through what HCA according to the access technology (i.e., the access network type).

The flow binding list of a specific MN and the flow binding table 950 for an MN that is managed in the MICS have to be symmetrically congruent with each other. In order for the flow binding lists to be symmetrically congruent with each other as described above, necessary information can be updated through the transmission and reception of signals between the MN and the MICS. This can be embodied in various ways according to the policies of network service providers and users' preference.

Furthermore, the MICS manages the following information for each session in relation to flows that are now exchanged in the entire system.

TABLE 7

| | | | | Session Information | | | Lifetime |
|---|---|---|---|---|---|---|---|
| X-ID | X-HoAv4 | Y-ID | Y-HoAv4 | A pair of 5-tuples | X-HCA(CoA) | Y-HCA(CoA) | |
| MN1's NAI | MN1 HoA (IP1) | MN2's NAI | MN2 HoA (IP2) | <IP1, IP2, 212, 80, tcp> <IP2, IP1, 80, 212, tcp> | HCA#1 | HCA#4 | 300 s |

Table 7 shows an example of a session information table that is managed in an MICS.

Referring to Table 7, an X-ID indicates the ID of an MN1. An NAI is used as the ID of the MN1. X-HoAv4 indicates the HoA of the MN1. In this example, IPv4 is used. Y-ID indicates the ID of an MN2. The MN2 is a corresponding MN which communicates with the MN1, and an NAI is also used as the ID of the MN2. Y-ID indicates the HoA of the MN2. In this example, IPv4 is used. Session information in the session information table indicates information on an interactive flow that participates in a session in the form of a 5-tuple pair. X-HCA (CoA) and the Y-HCA (CoA) indicate two HCAs that perform tunneling for flow sessions. Lifetime indicates the time when corresponding session information is valid. From Table 7, it can be seen that one session has been set up between the MN1 and the MN2, the MN1 and the MN2 communicate with each other through the session, and flows within the session are transmitted and received through the HCA#1 and the HCA#4.

Meanwhile, a HCA manages a Packet Forwarding Table (PFT). When a specific MN starts sending packets, an MICS and HCAs between both ends exchange a location query/response message and a location notification/notification Ack. message, and the HCA can manage (or generate or update) the PFT based on the messages.

Table 8 and Table 9 below indicate pieces of information that are included in the PFT of a HCA#1 for an MN1 and the PFT of a HCA#4 for an MN2 when the MN1 and the MN2 exchange sessions.

TABLE 8

| | | | Forwarding per Flow | | |
|---|---|---|---|---|---|
| No | (Corresponding) MN-ID | Destination | Flow Selector | HCA(CoA) | Lifetime |
| 1 | MN2' NAI | MN2 HoA(IP2) | (IP1, *, *, 80, *) | HCA#4 | 200 s |
| | | | default | HCA#4 | 300 s |

Table 8 shows the PFT of the HCA#1 to which the MN1 is connected when the MN1 and the MN2 exchange sessions.

TABLE 9

| | | | Forwarding per Flow | | |
|---|---|---|---|---|---|
| No | (Corresponding) MN-ID | Destination | Flow Selector | HCA(CoA) | Lifetime |
| 1 | MN1' NAI | MN1 HoA(IP1) | (IP2, *, 80, *, *) | HCA#1 | 200 s |
| | | | default | HCA#1 | 300 s |

Table 9 shows the PFT of the HCA#4 to which the MN2 is connected when the MN1 and the MN2 exchange sessions.

Referring to Table 8 and Table 9, a (corresponding) MN-ID indicates the ID of an MN which receives a signal. In other words, the MN-ID means the ID of the MN2 that performs communication with the MN1 from a viewpoint of, for example, the MN1 (i.e., an MN that sends a signal), and an NAI is used as the MN-ID. From a viewpoint of the MN2, the MN-ID means the ID of the MN1 that performs communication with the MN2, and an NAI is used as the MN-ID. A destination indicates the HoA of the other MN that performs communication with one MN. A HCA performs determination for packet forwarding depending on a flow selector. A HCA (CoA) indicates the CoA of a HCA to which the other MN performing communication with one MN is connected.

From Tables 8 and 9, it can be seen that one session is set up between the MN1 and the MN2, communication between the MN1 and the MN2 is performed, packet forwarding is performed from the HCA#1 to the HCA#4 in a flow transmitted from the MN1 to the MN2 within the session, and packet forwarding is performed from the HCA#4 to the HCA#1 in a flow from the MN2 to the MN1 within the session.

A schematic data flow processing method is described below.

Figure 10:
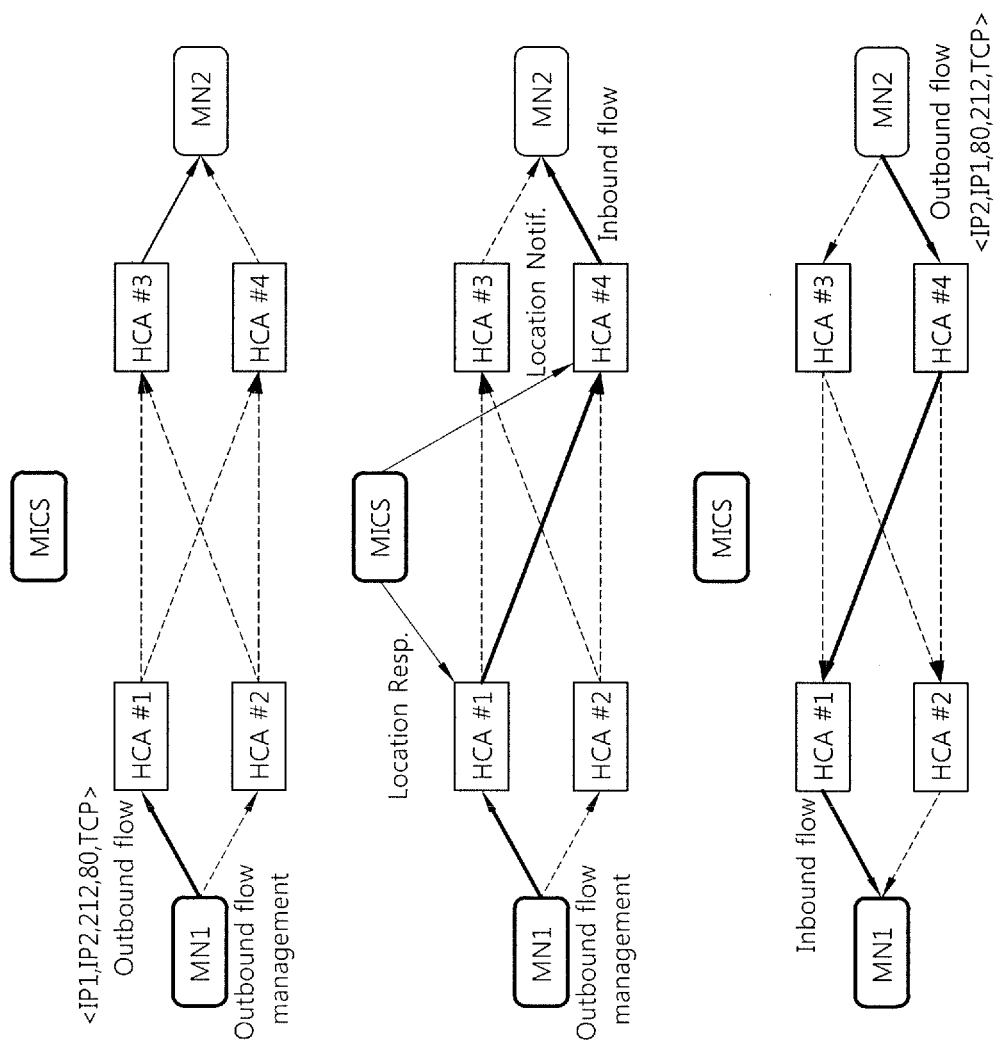
FIG. 10 shows a schematic example of a flow binding processing method in accordance with the present invention.

FIG. 10 shows a schematic example of a flow binding processing method in accordance with the present invention.

Referring to FIG. 10, if an MN1 wants to send a specific data flow to an MN2, the MN1 selects one of a HCA#1 and a HCA#2 connected thereto. If the MN1 selects the HCA#1, when the HCA#1 receives a packet from the MN1, the HCA#1 obtains information on whether the MN2 wants to receive a data flow using what access technology from an MCIS through a location response message and forwards the corresponding flow to a HCA#4. In this case, the HCA#4 obtains information on the location of the HCA#1 through a location notification message from the MCIS. If a data flow forms an interactive session, the MN2 can send a data flow to the MN1 in the reverse direction to a path along which the MN1 has sent a data flow.

4. Process of Transferring Initial Data Flow

In a packet transfer procedure, the CoA address (i.e., the address of a HCA) of a Corresponding Node (CN) (e.g., an MN2) that is included in a location query/response messages and a location notification/notification Ack. message may become an IPv4 or IPv6 address depending on whether a core network where a HCA to which an MN (e.g., an NN1) is connected and an MICS are placed is IPv4 or IPv6. Furthermore, the type of tunnel formed depending on the type of CoA may be as follows.

TABLE 10

| -IPv4 Core Network | -IPv6 Core Network |
|---|---|
| :IPv4 in IPv4 | :IPv4 in IPv6 |
| :IPv6 in IPv4 | :IPv6 in IPv6 |

Table 10 shows the type of tunnel that may be generated depending on whether a core network is IPv4 or IPv6. Internal data transferred by a tunnel may generate an IPv4 session or an IPv6 session depending on the type of data sessions that are exchanged between an MN and a CN performing communication with the MN.

Figure 11:
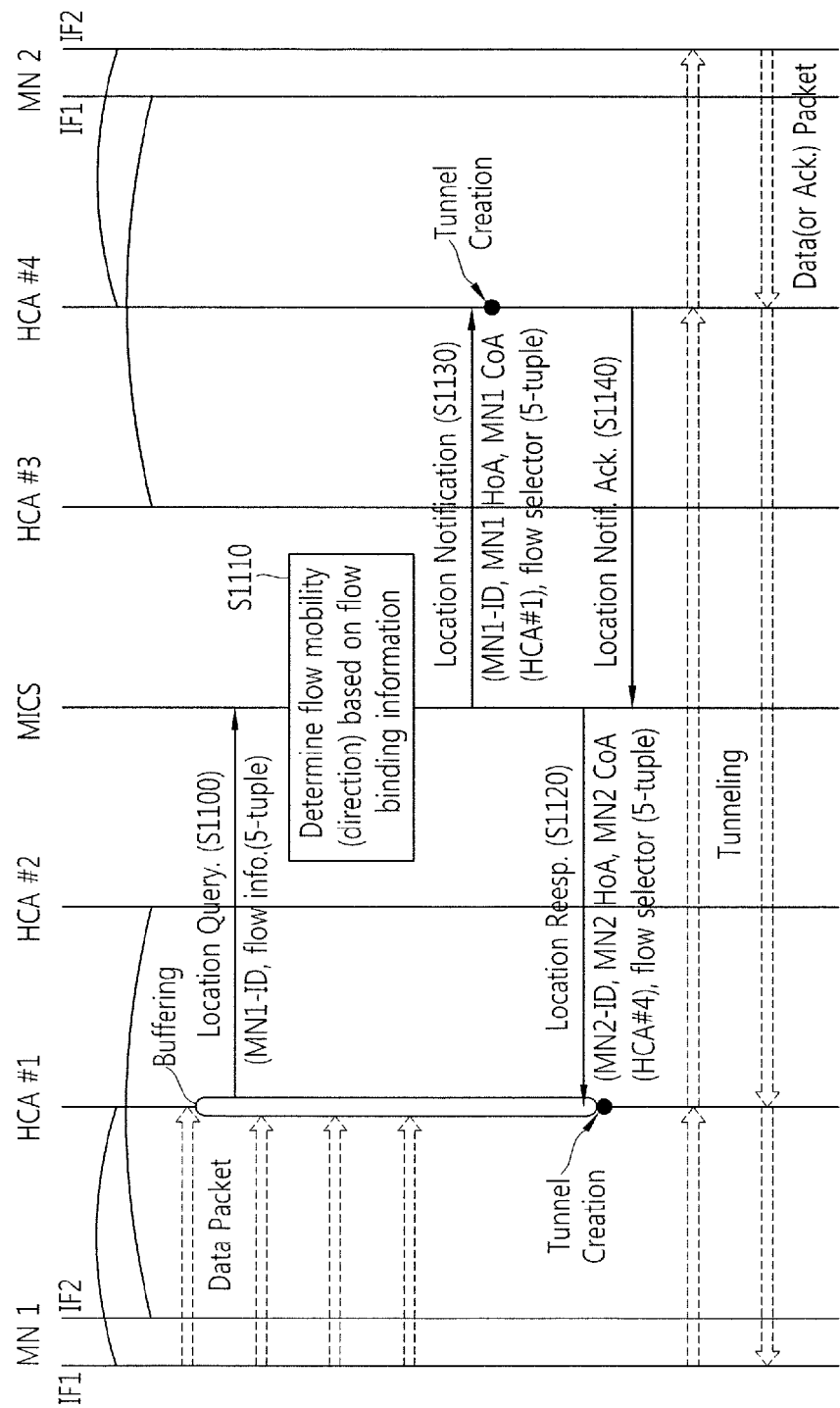
FIG. 11 is a flowchart illustrating an initial data flow transfer process in accordance with an example of the present invention.

FIG. 11 is a flowchart illustrating an initial data flow transfer process in accordance with an example of the present invention. FIG. 11 shows an initial data flow transfer process between an MN1 and an MN2.

Referring to FIG. 11, in the state in which the MN1 and the MN2 have been registered with an MICS, data packets transmitted from the MN1 to the MN2 are transferred to different HCAs depending on a physical interface to which a corresponding packet is transferred from the MN1. In the example of FIG. 11, the data packets are transferred to the HCA#1 through the IF1 of the MN1. The data packets may generate an IPv4 session or an IPv6 session. If the IPv4 session is generated, the address of the MN1 and the MN2 is an IPv4 address. If the IPv6 session is generated, the address of the MN1 and the MN2 is an IPv6 address. Likewise, data packets transmitted from the MN2 to the MN1 are transferred to different HCAs depending on a physical interface to which a corresponding packet is transferred from the MN2. In the example of FIG. 11, the data packets are transferred to a HCA#4 through the IF2 of the MN2. Here, the address of HCAs may be an IPv4 or IPv6 address depending on the address policy of a core network.

In order to send the data packet received from the MN1, the HCA#1 recognizes 5-tuple information on the packet and determines a next hop with reference to a PFT. Here, the PFT may be configured as in Table 4, Table 8, or Table 9. If information on a destination address for the 5-tuple flow information is not included in the PFT, the HCA#1 sends a location query message to an MICS at step S1100. The HCA#1 may query the MICS about a current CN (i.e., the MN2) using the location query message. Here, the location query message includes an MN1-ID, the address (IPv4 or IPv6) of the HCA#1, and the 5-tuple information of a corresponding flow.

Packets that are received during the delay of the location query about the CN (i.e., the MN2) are stored in the internal buffer of the HCA#1. If the number of packets stored in the internal buffer exceeds a predetermined threshold, a HCA (i.e., the HCA#1) may request an MN (i.e., the MN1) to reduce the number of transmitted packets by sending a source quench message having an Internet Control Message Protocol (ICMP) to the MN.

In response to the location query message received from the HCA#1, the MICS obtains information on whether the packet will be transmitted to which one of HCAs in which the CN (i.e., the MN2) is placed by searching for its own GBT and flow binding table. That is, the MICS determines flow mobility (direction) based on the flow binding information at step S1110. In the example of FIG. 11, it has been illustrated that the MICS selects (determines) the HCA#4 of the HCA#3 and the HCA#4 where the MN2 is placed. Here, the GBT may be configured like the GBT of Table 1 or 10. Furthermore, the flow binding table may be configured like the flow binding table of FIG. 10.

Next, the MICS sends a location response message to the HCA#1 at step S1120. The MICS informs the HCA#1 of the address of the HCA#4 using the location response message. The location response message includes an MN-ID, information on the CoA (i.e., the HCA#4) of the MN2, and information on the flow selector of a current flow.

The HCA#1 generates a tunnel for the HCA#4 and adds information on a tunnel interface between the HCA#1 and the HCA#4 for the flow selector, which is included in the location response message received from the MICS and configured to enable a current flow to be filtered, to the PFT. At this point, buffering is stopped, and the HCA#1 transfers the packet through tunneling. Here, the type of generated tunnel, as can be seen from Table 10, is different depending on the type of address policy of a core network and the type of session between an MN (i.e., the MN1) and a CN (i.e., the MN2).

The MICS changes a source address into a destination address and a destination address into a source address in relation to the 5-tuple information on the flow received from the HCA#1 and configures 5-tuple information in which a transmission port and a reception port have been exchanged. The 5-tuple information is information on a flow in the reverse direction to the existing flow along which the packet is transmitted from the HCA#1 to the HCA#4. The reason why the information on a flow in the reverse direction is configured is that information on a flow selector that must be transmitted to the MN2 (or a HCA to which the MN2 is connected) may become information on a flow selector in the reverse direction to the flow along which the packet is now transmitted from the MN1. The MICS searches its own flow binding table for an adequate entry based on the flow information in the reverse direction and sends a location notification message to the HCA#4 at step S1130. The MICS may transfer information on the HCA#1, that is, the CoA of the MN1, to the HCA#4 using the location notification message.

Here, the location notification message includes an MN-ID, information on the CoA of the MN1 (i.e., the HCA#1), and information on the flow selector of a flow in the reverse direction to the current flow.

In response to the location notification message, the HCA#4 adds the information on the tunnel interface between the HCA#1 and the HCA#4 for the flow selector, included in the location notification Ack. message and configured to enable the flow in the reverse direction to be filtered, to its own PFT. Furthermore, the HCA#4 sends a location notification Ack. message to the MICS at step S1140. Here, the type of generated tunnel, as can be seen from Table 10, is different depending on the type of address policy of a core network and the type of session between the MN2 and the MN1.

Control messages may be used in the above procedures, and the control messages can be transferred through a Label-Switched Path (LSP) tunnel.

Meanwhile, the step S1130 may be performed prior to the step S1120, the step S1120 may be performed prior to the step S1130, or both the steps S1130 and S1120 may be performed at the same time.

5. Flow Mobility Procedure

Flow mobility control proposed in the present invention is performed over a network. In this case, an MN itself may connect to a new interface. Furthermore, an MICS may move a specific service flow from an interface, now being served, to another interface, and a service flow may be moved to another interface under the determination of an MN and the permission of an MICS. Accordingly, "network-based flow mobility technology" defined in the present invention and a point of time at which flow mobility control is initiated according to the present invention include the following contents.

(1) Movement of Flow According to New Connection of MN

When an MN connects to a specific network through a new interface, flow mobility control may be initiated. Here, a redistribution task for a flow is automatically initiated based on flow binding information owned by an MICS and the MN.

(2) Movement of Flow According to Determination of MICS

A network side in which an MICS is installed can check the state (e.g., whether a link operates or not, a congestion status, the number of terminals being served, and the number of flows) of wired/wireless links. Accordingly, the MICS can initiate a flow mobility control procedure under its determination anytime.

(3) Movement of Flow According to Determination of MN and Permission of MICS

An MN may try to move a specific flow from an interface, now being served, to another interface sometimes. Here, a network has to be able to permit this flow movement. Thus, the MN can request items regarding the flow movement from an MICS, receive permission from the MICS, and then move a corresponding flow.

For example, the cases (1) to (3) may be described as below.

Case 1: Flow Mobility Procedure According to New Connection of Mobile Terminal

Figure 12:
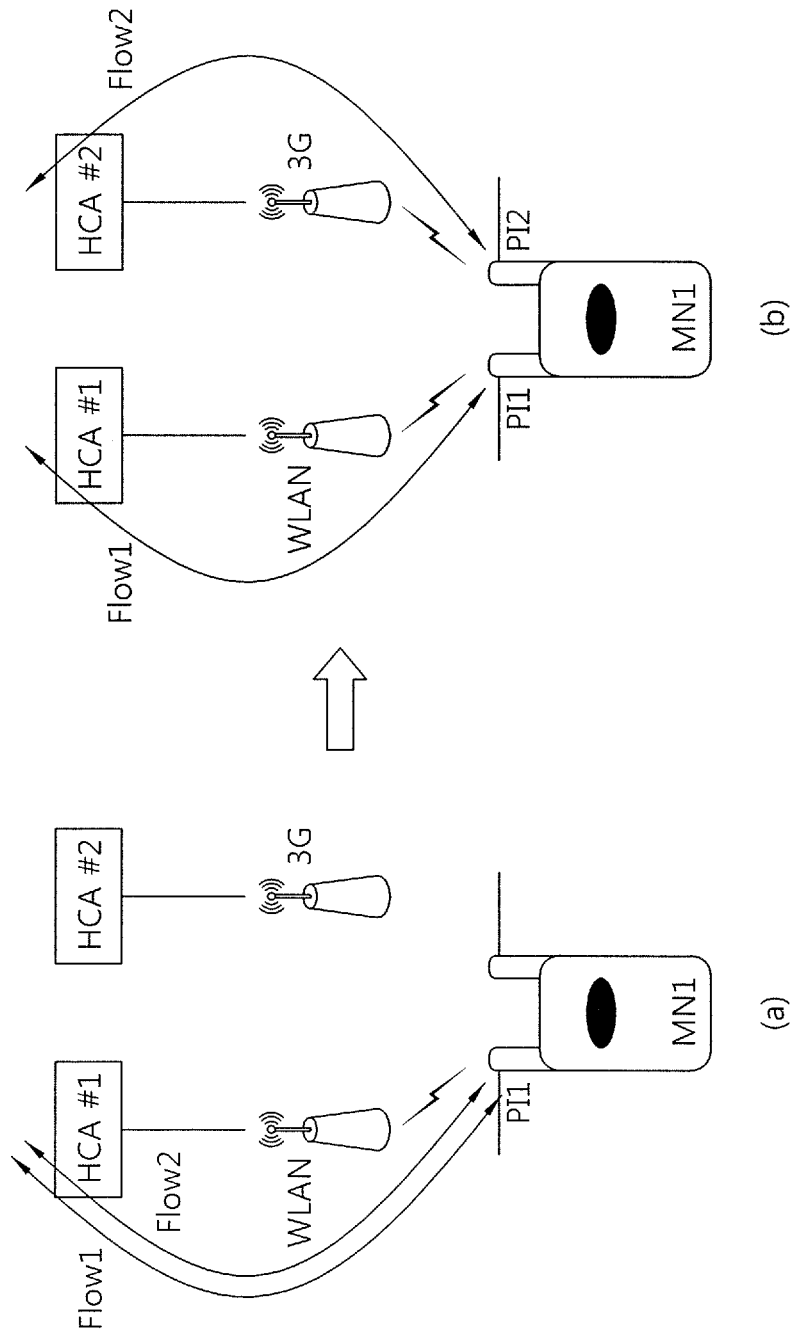
FIG. 12 shows a flow mobility procedure according to the new connection of a mobile terminal in accordance with the present invention.

FIG. 12 shows a flow mobility procedure according to the new connection of a mobile terminal in accordance with the present invention.

Referring to (a) of FIG. 12, an MN transmits and receives a flow 1 and a flow 2 through a HCA#1 using a WLAN PI1 interface from among physical interfaces owned by the MN. Here, it is assumed that the flow ID of the flow 1 is 4 and the flow ID of the flow 2 is 3. In this case, a flow binding table and a session information table managed in an MICS may be shown as below.

TABLE 11

| Flow ID | Priority | Flow Selector | Binding IDs | Type | Lifetime |
|---|---|---|---|---|---|
| 4 | 4 | (IP2, *, 21, *, *) | WL→3G→WB | Static | ∞ |
| 3 | 3 | (*, *, 150, *, UDP) | 3G→WL→WB | Static | ∞ |
| 2 | 2 | (*, FF01::/64, *, *, *) | WL, 3G, WB | Default | ∞ |
| 1 | 1(The lowest) | (*, *, *, *, *) | 3G→WL→WB | Default | ∞ |

TABLE 12

| Flow ID | Priority | Flow Selector | Binding IDs | Type | Lifetime |
|---|---|---|---|---|---|
| 4 | 4 | (IP1, *, *, 21, *) | WL→3G | Static | ∞ |
| 3 | 3 | (*, *, *, 150, UDP) | 3G→WL | Static | ∞ |
| 2 | 2 | (*, FF01::/64, *, *, *) | WL, 3G | Default | ∞ |
| 1 | 1(The lowest) | (*, *, *, *, *) | 3G→WL | Default | ∞ |

TABLE 13

| | | | | Session Information | | | Lifetime |
|---|---|---|---|---|---|---|---|
| X-ID | X-HoAv4 | Y-ID | Y-HoAv4 | A pair of 5-tuples | X-HCA(CoA) | Y-HCA(CoA) | time |
| MN's NAI | MN HoA (IP1) | CN's NAI | CN HoA (IP2) | <IP1, IP2, 212, 80, TCP> <IP2, IP1, 80, 212, TCP> | HCA#1 | HCA#4 | 250 s |
| | | | | <IP1, IP2, 399, 150, UDP> <IP2, IP1, 150, 399, UDP> | HCA#1 | HCA#4 | 300 s |

Table 11 shows an initial flow binding table for an MN (e.g., an MN1), Table 12 shows an initial flow binding table for a CN (e.g., an MN2) that performs communication with the MN, and Table 13 shows a session information table.

As can be seen from Tables 11 to 13, the flow 2 corresponds to a case where a 5-tuple corresponds to (*,*,150,*,UDP) or (*,*,*,150,UDP) and 3G is higher in priority in the corresponding flow, but connection cannot be set up through a 3G interface because an MN has not yet set up network connection through the 3G interface. In this case, the MN can transmit and receive the flow 2 over a WLAN in the second highest priority. However, if the MN sets up network connection through the 3G interface later, the MN can transmit and receive the flow 2 through a HCA#2 using an PI2, that is, the 3G interface, as shown in (b) of FIG. 12 because binding information on the flow 2 is higher than that of 3G. A flow mobility control procedure therefore may be described in detail as follows.

Figure 13:
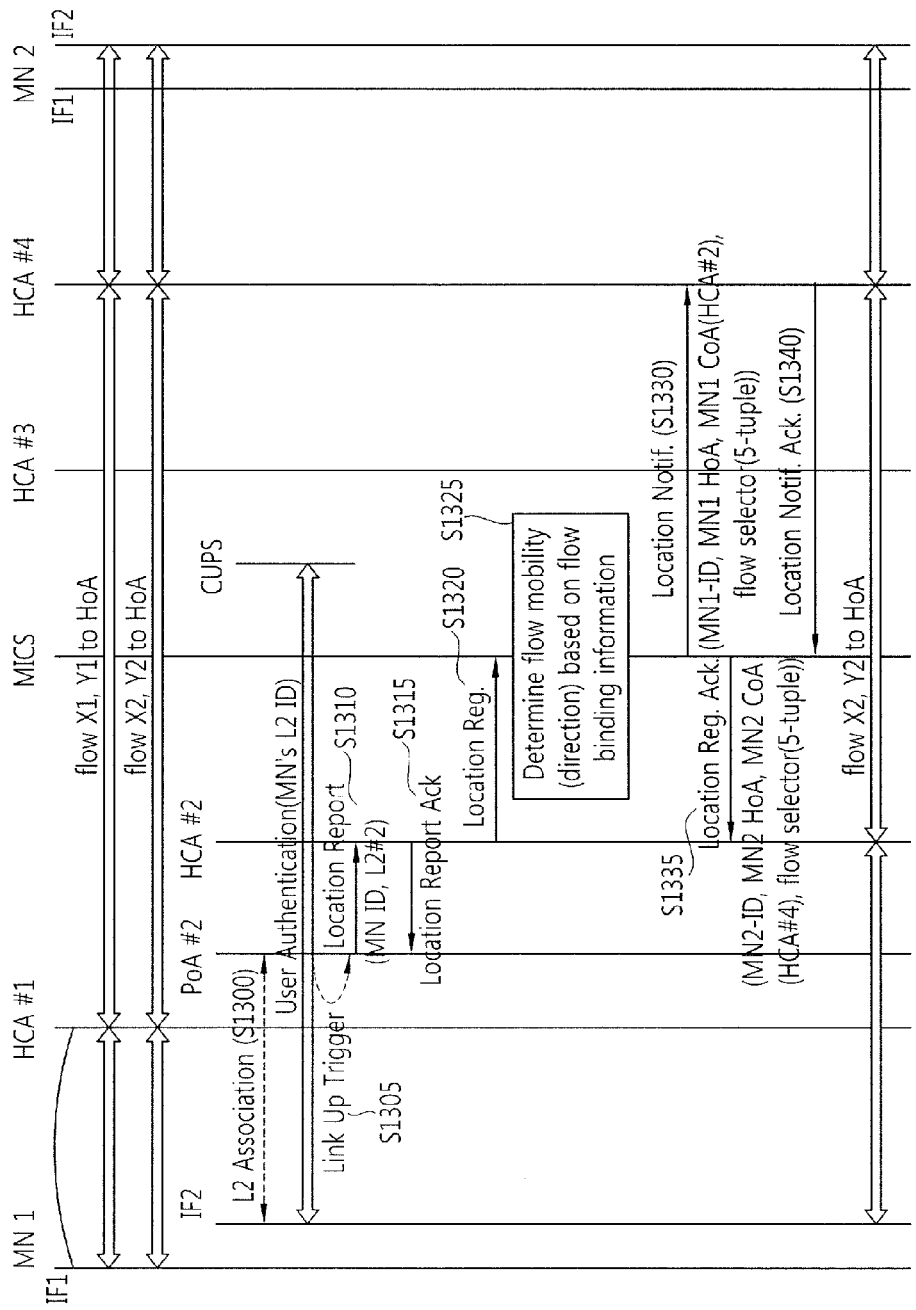
FIG. 13 is a flowchart illustrating a flow mobility control procedure according to the new connection of an MN in accordance with an example of the present invention.

FIG. 13 is a flowchart illustrating a flow mobility control procedure according to the new connection of an MN in accordance with an example of the present invention.

Referring to FIG. 13, an MN is initially connected to a network through only an interface IF1 and is exchanging flows X1, Y1, X2, and Y2 with a CN through the IF1. Next, the MN is connected to a new network through an IF2. If a new network has higher priority than the network for the flows X2 and Y2, a movement of the flows X2 and Y2 occurs.

More particularly, the MN sets up an L2 association using PoA#2, that is, a Point of Attachment (PoA) for a new network through the IF2 at step S1300. A process of the MN setting up the L2 association through the IF2 includes a user authentication procedure for checking whether a user who has subscribed to each service provider network has an access right or not. Here, the user authentication procedure is performed by the exchange of pieces of authentication information between the MN and a CUPS which manages a subscriber profile for the access network. The ID of the MN used in the CUPS is an NAI.

After the L2 association process including the user authentication procedure is completed through the IF2 of the MN, an L2 link up trigger that informs the new link setup is generated in the L2 layer of a PoA#2 at step S1305. The L2 link up trigger is converted into an MIH link up trigger by the Media Independent Handover (MIH) layer of the PoA#2.

The PoA#2 sends a location report message for initiating a network-based registration procedure on the basis of the MIH link up trigger to a HCA#2 at step S1310. The location report message includes the ID of the MN and an L2 ID#2, that is, the L2 ID for the IF2.

In response to the location report message, the HCA#2 sends a location report Ack. message to the PoA#2 at step S1315. Next, the HCA#2 extracts the L2 ID of the MN and searches an MN Binding Table (MBT), managed by the HCA#2, for a corresponding binding entry. The HCA#2 records the ID of the MN, the L2 ID#2, that is, information on the L2 ID for the IF2, the type of access network, lifetime, and the Network Interface Card (NIC) ID of the HCA#2 on the binding entry.

The HCA#2 sends a location registration message to the MICS at step S1320. The location registration message includes the ID of the MN, the L2 ID#2, that is, the L2 ID of the IF2, and information on a CoA#2, that is, the IP address of the HCA#2.

The MICS determines flow mobility (direction) for the flows X2 and Y2 based on the flow binding information if the priority of the network for the flows X2 and Y2 is higher than that of a new network to which the IF2 is connected at step S1325.

The MICS sends a location notification message to a HCA#4 at step S1330. In this case, the MICS may transfer information on the HCA#2 of the MN (i.e., information on a CoA) and information on a flow selector, managed as its own session information, to the MN based on the session information.

Meanwhile, the MICS sends a location registration Ack. message to the HCA#2 at step S1335. In this case, the MICS may transfer information on the HCA#4 (i.e., information on a CoA) and information on a flow selector, managed as its own session information, to the MN based on the session information.

The HCA#4 sends a location notification Ack. message to the MICS at step S1340. Next, the MN can exchange the flow X2 and the flow Y2 with a CN via the HCA#4 through the HCA#2, newly connected with the MN, using the IF2. The flow movement situation is described in short below.

Figure 14:
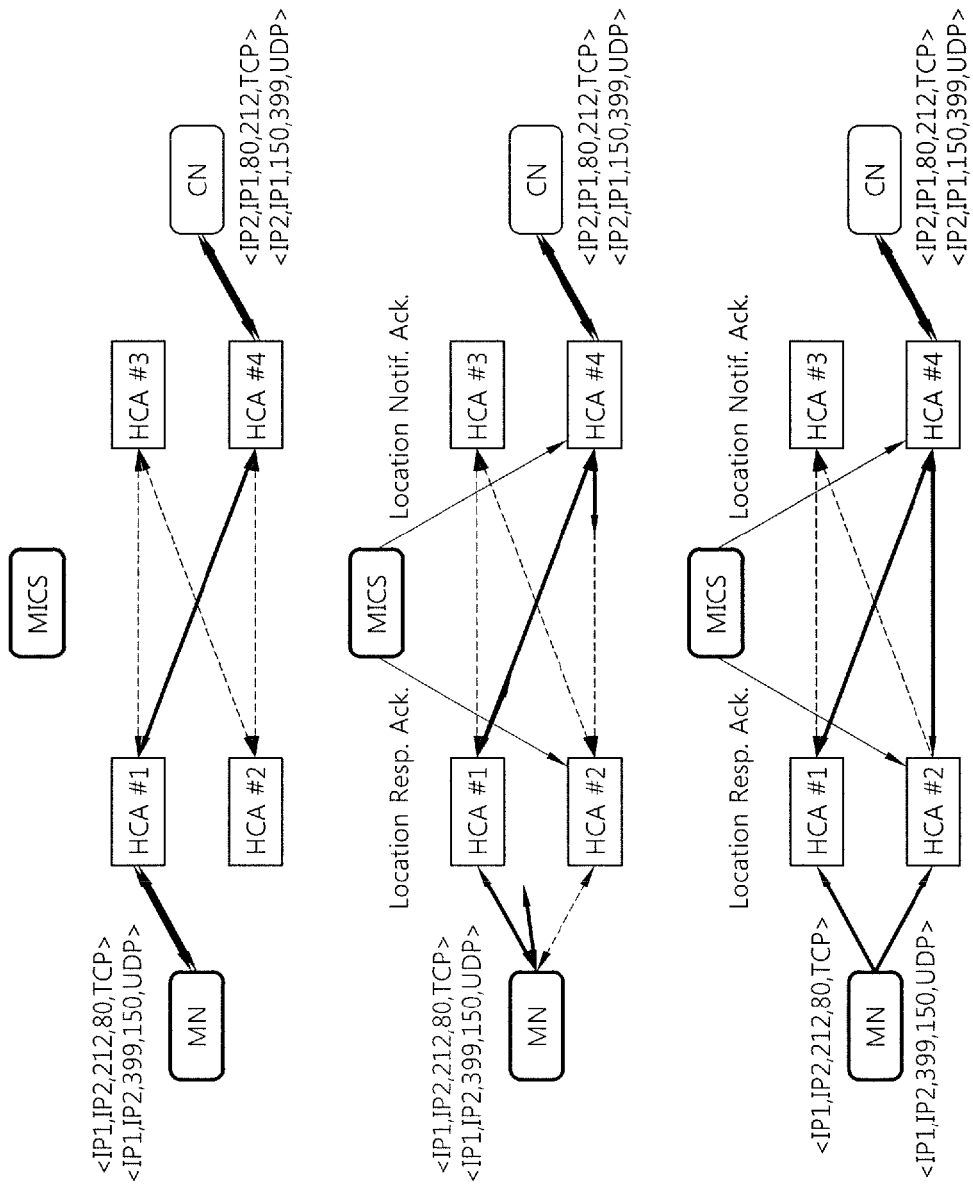
FIG. 14 schematically shows a flow movement situation according to the new connection of an MN.

FIG. 14 schematically shows a flow movement situation according to the new connection of an MN.

Referring to FIG. 14, an MN is initially connected to a network through only an interface IF1 and is exchanging flows X1, Y1, X2, and Y2 with a CN through the IF1. In this case, for example, it is assumed that the 5-tuple of the flow X1 is (IP1, IP2, 212, 80, TCP), the 5-tuple of the flow X2 is (IP1, IP2, 399, 150, UDP), the 5-tuple of the flow Y1 is (IP2, IP1, 80, 212, TCP), and the 5-tuple of the flow Y2 is (IP2, IP1, 150, 399, UDP). All the flows are transmitted and received between the MN and the CN through a HCA#1 and a HCA#4. Next, if the MN is connected to a new network through an IF2 and the priority of the network for the flows X2 and Y2 is higher than that of the new network, a flow movement for the flows X2 and Y2 occurs. Here, the MN performs a location registration process and a location registration Ack. process with an MICS through a HCA#2, that is, a new network, and the MICS exchanges a location notification message and a location notification Ack. message with the HCA#4 of the CN with which the MN is now communicating with. In this process, the MICS transfers information on each CoA (i.e., information on mutual HCAs) and information on a flow selector, being managed as its own session information, to the HCA#4 of the CN and the new HCA#2 of the MN1 based on the session information. As a result, the flow X2 and the flow Y2 are transmitted and received over the HCA#2 of the new network through the IF2 of the MN. That is, the flow X2 and the flow Y2 are transmitted and received between the MN and the CN through the HCA#2 and the HCA#4. After flow mobility control is performed as described above, the PFTs in the HCA#2 and the HCA#4 and the session information table of the MICS may have the following forms.

TABLE 14

| | | | Forwarding per Flow | | |
|---|---|---|---|---|---|
| No | (Corresponding) MN-ID | Destination | Flow Selector | HCA(CoA) | Lifetime |
| 1 | CN's NAI | CN HoA(IP2) | (*, *, *, 150, UDP) | HCA#4 | 200 s |
| | | | default | HCA#4 | 300 s |

TABLE 15

| | | | Forwarding per Flow | | |
|---|---|---|---|---|---|
| No | (Corresponding) MN-ID | Destination | Flow Selector | HCA(CoA) | Lifetime |
| 1 | MN's NAI | MN HoA(IP2) | (IP1, *, 21, *, UDP) | HCA#1 | 150 s |
| | | | (*, *, 150, *, UDP) | HCA#1→ HCA#2 | 200 s |
| | | | default | HCA#1 | 300 s |

TABLE 16

| | | | | Session Information | | | Life- |
|---|---|---|---|---|---|---|---|
| X-ID | X-HoAv4 | Y-ID | Y-HoAv4 | A pair of 5-tuples | X-HCA(CoA) | Y-HCA(CoA) | time |
| MN's NAI | MN HoA (IP1) | CN's NAI | CN HoA (IP2) | <IP1, IP2, 212, 80, TCP> <IP2, IP1, 80, 212, TCP> | HCA#1 | HCA#4 | 250 s |
| | | | | <IP1, IP2, 399, 150, UDP> <IP2, IP1, 150, 399, UDP> | HCA#2 | HCA#4 | 300 s |

Table 14 shows the PFT of the HCA#2, Table 15 shows the PFT of the HCA#4, and Table 16 shows the session information table of the MICS. From Table 15, it can be seen that the forwarding address of the flow Y2 having a 5-tuple value of (IP2, IP1, 150, 399, UDP) has changed from the HCA#1 to the HCA#2, as described with reference to FIG. 14. Furthermore, from Table 16, it can be seen that the flow X2 having a 5-tuple value of (IP1, IP2, 399, 150, UDP) and the flow Y2 having a 5-tuple value of (IP2, IP1, 150, 399, UDP) are transmitted and received through a session set up between the HCA#2 and the HCA#4, as described with reference to FIG. 14.

Case 2: Flow Mobility Procedure According to Independent Determination of MICS

A network side in which an MICS operates as described above can check the state (e.g., whether a link operates or not, a congestion status, the number of terminals being served, and the number of flows) of wired/wireless links. Accordingly, a flow can be moved at a specific point of time under the determination of the MICS. In this case, characteristics are as follows.

From a viewpoint of a recipient node (e.g., an MN2 or CN) that receives an inbound flow, an MICS can move only the inbound flow received by the recipient. That is, an MN (e.g., an MN1) determines that an outbound flow will be transmitted through what interface, and the MICS may change the inbound flow so that the inbound flow is received through another interface (or another network) from a viewpoint of a recipient that receives the inbound flow. Even in this case, however, if the outbound flow transmitted by the recipient node is placed in the same session as the moved inbound flow, the MICS may perform control so that the outbound flow is transmitted through the same interface as an interface through which the inbound flow has been received.

Furthermore, the MICS may insert a dynamic entry, managed in a soft state, into a flow binding table according to a criterion that moving a flow is soft under its determination.

A procedure in which a flow is moved under the determination of an MICS may be described in detail as follows.

Figure 15:
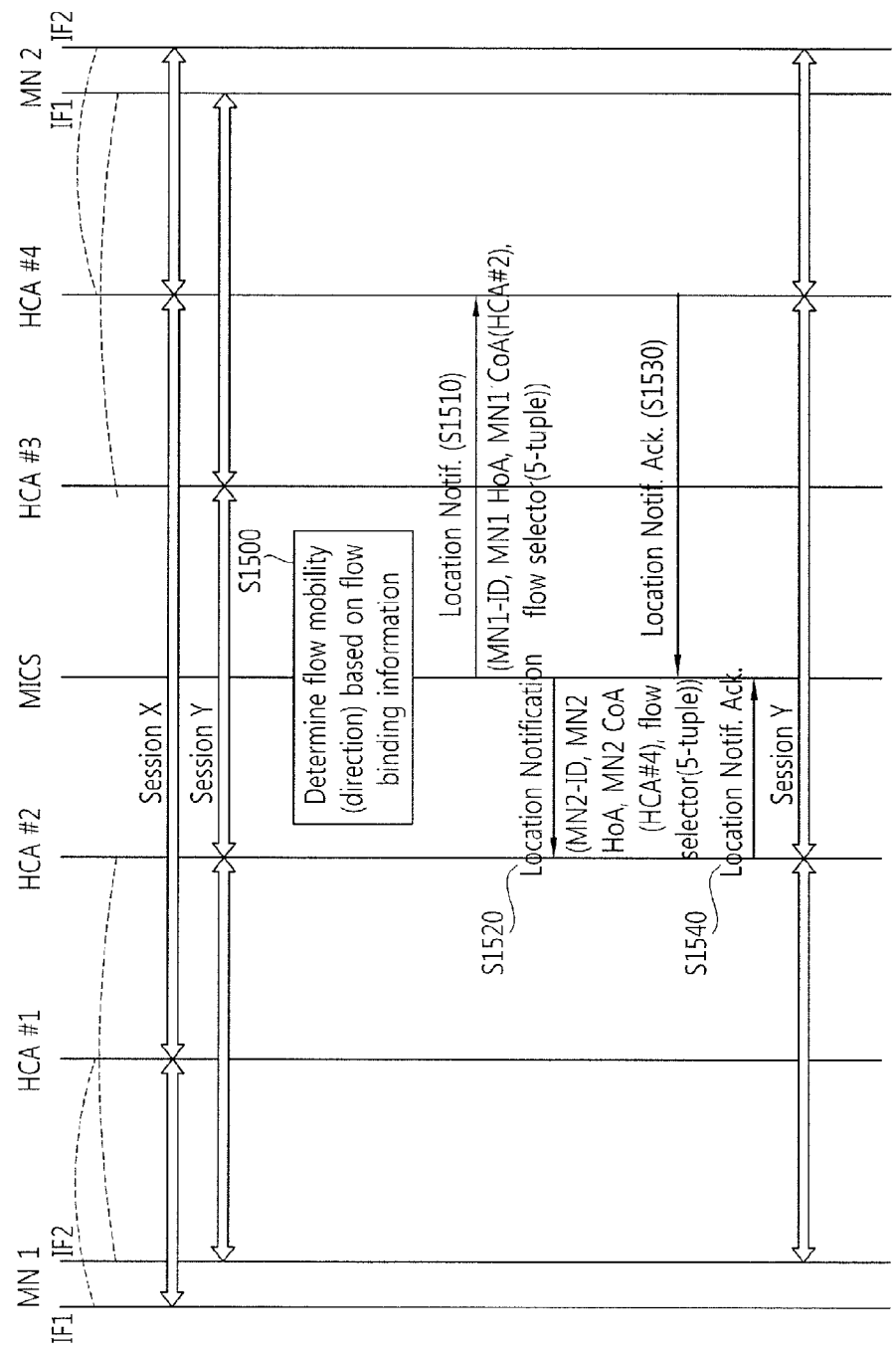
FIG. 15 is a flowchart illustrating a procedure in which a flow is moved under the determination of an MICS in accordance with an example of the present invention.

FIG. 15 is a flowchart illustrating a procedure in which a flow is moved under the determination of an MICS in accordance with an example of the present invention. FIG. 15 shows an example in which each of an MN1 and an MN2 connects to two interfaces (e.g., 3G and WLAN) with a network and the MN1 and the MN2 exchange flows regarding a session X and a session Y. As described above, from a viewpoint of the MN1, the MN2 communicating with the MN1 may be called a CN, and vice versa.

Referring to FIG. 15, the session X is configured between the HCA#1 of the MN1 and the HCA#4 of the MN2, and the session Y is configured between the HCA#2 of the MN1 and the HCA#3 of the MN2. An MICS determines a flow movement based on a network status at step S1500. For example, the MICS may determine to move a flow (this flow is an outbound flow from a standpoint of the MN1 and is an inbound flow from a standpoint of the MN2) from the MN1 to the MN2, from among the flows of the session Y, from the existing network of the MN2 to a new network. In this case, the MICS may insert a dynamic entry, managed in a soft state, into a flow binding table according to a criterion that moving a flow is soft under its determination. Here, the flow binding table for the MN2 which is managed by the MICS and to which the dynamic entry has been newly added may have the following form.

TABLE 17

| Flow ID | Priority | Flow Selector | Binding IDs | Type | Life-time |
|---|---|---|---|---|---|
| 101 | 5 | (IP1, IP2, 399, 150, UDP) | WL | Dynamic | 30 s |
| 4 | 4 | (IP1, *, *, 21, *) | WL→3G | Static | ∞ |
| 3 | 3 | (*, *, *, 150, UDP) | 3G→WL | Static | ∞ |
| 2 | 2 | (*, FF01::/64, *, *, *) | WL, 3G | Default | ∞ |
| 1 | 1(The lowest) | (*, *, *, *, *) | 3G→WL | Default | ∞ |

Referring to Table 17, the MN2 is receiving the existing inbound flow having a 5-tuple value (IP1, IP2, 399, 150, UDP) over a 3G network that is managed by the HCA#3 of a flow ID 3, and the MICS has added a dynamic entry, such as a flow ID 101, in order to move the 3G network to a WLAN managed by the HCA#4 under its determination. The dynamic entry is a flow selector that has very detailed information on a corresponding flow, and lifetime for maintaining a soft state is set in the dynamic entry. Accordingly, if a corresponding flow is not received for a specific time, the corresponding entry is deleted, and the MN2 receives a subsequent inbound flow using an original static entry, that is, the flow ID 3.

After adding the dynamic entry, the MICS sends a location notification message to the HCA#4 at step S1510. The HCA#4 is a HCA that has been newly selected in order to send a flow (i.e., an inbound flow from a standpoint of the MN2) to the MN2. The location notification message includes an MN1-ID, an MN1 HoA, an MN1 CoA (HCA#2), and information on a flow selector on a flow that is transmitted from the MN2 to the MN1, from among the flows of the session Y. The MICS knows that a new flow will be transmitted to the HCA#4 and the HCA#4 can perform a tunneling task through the location notification message.

Furthermore, the MICS sends a location notification message to the HCA#2 at step S1520. Here, the HCA#2 is a HCA through which a corresponding flow (i.e., an outbound flow form a viewpoint of the MN1) is uploaded from the MN1. The location notification message includes an MN2-ID, an MN2 HoA, an MN2 CoA (HCA#4), and information on a flow selector on a flow transmitted from the MN1 to the MN2, from among the flows of the session Y. The MICS can inform the HCA#2 that a counterpart for tunneling is the HCA#4 not the existing HCA#3 through the location notification message.

Each of the HCA#4 and the HCA#2 sends a location notification Ack. message to the MICS at steps S1530 and S1540.

Next, the HCA#2 and the HCA#4 can send a corresponding flow through the new path between the HCA#2 and the HCA#4. In this case, from a viewpoint of the MN2, a flow not identical with original flow binding list information managed by the MN2 may be received through the HCA#4. In this case, the MN2 may receive the corresponding flow passively and add a dynamic entry to its flow binding list as follows.

TABLE 18

| Flow ID | Priority | Flow Selector | Outbound Interfaces | Type | Lifetime |
|---|---|---|---|---|---|
| 101 | 5 | (IP2, IP1, 150, 399, UDP) | WL | Dynamic | 30 s |
| 4 | 4 | (*, IP1, 80, *, *) | WL→3G | Static | ∞ |
| 3 | 3 | (*, *, 150, *, UDP) | 3G→WL | Static | ∞ |
| 2 | 2 | (*, FF02::/64, *, *, *) | WL, 3G | Default | ∞ |
| 1 | 1(The lowest) | (*, *, *, *, *) | 3G→WL | Default | ∞ |

Referring to Table 18, the MN2 is sending the existing outbound flow having a 5-tuple values (IP2, IP1, 150, 399, UDP) over a 3G network that is managed by the HCA#3 of a flow ID 3, and the MN2 had added a dynamic entry, such as a flow ID 101, in order to move the corresponding flow to a WLAN that is managed by the HCA#4.

Case 3: Flow Mobility Procedure According to Determination of MN and Permission of MICS When a terminal itself tries to move some of flows, now being exchanged, from a current interface to another interface, an intention of the terminal may be transmitted to an MICS via a HCA and the MICS may determine suitability for the flow movement of the terminal according to circumstances. In this case, if the MICS determines that the flow movement is suitable, the terminal can move the flows as in a common location registration procedure. This has the following characteristics.

In Case 3, from a viewpoint of a sender node that sends a transmission flow, only a transmission flow can be moved. That is, an MN that sends a transmission flow has to determine whether a transmission flow will be transmitted through what interface and inform an MICS of his intention. If the MICS determines that the transmission of the transmission flow is suitable, the MN sends the transmission flow to an intended interface. If a reception flow is placed in the same session as a transmission flow, the reception flow enters an MN through the same interface. In this case, in order to process the reception flow, an MICS also changes its flow binding table for the MN that has requested a flow movement.

Furthermore, the MN and the MICS may insert a dynamic entry, managed in a soft state, into the flow binding list of the MN and the flow binding table for the MN managed by the MICS according to a criterion that moving a flow is soft.

A procedure in which a flow is moved under the determination of an MN and the determination of the suitability of an MICS is described in detail below.

Figure 16:
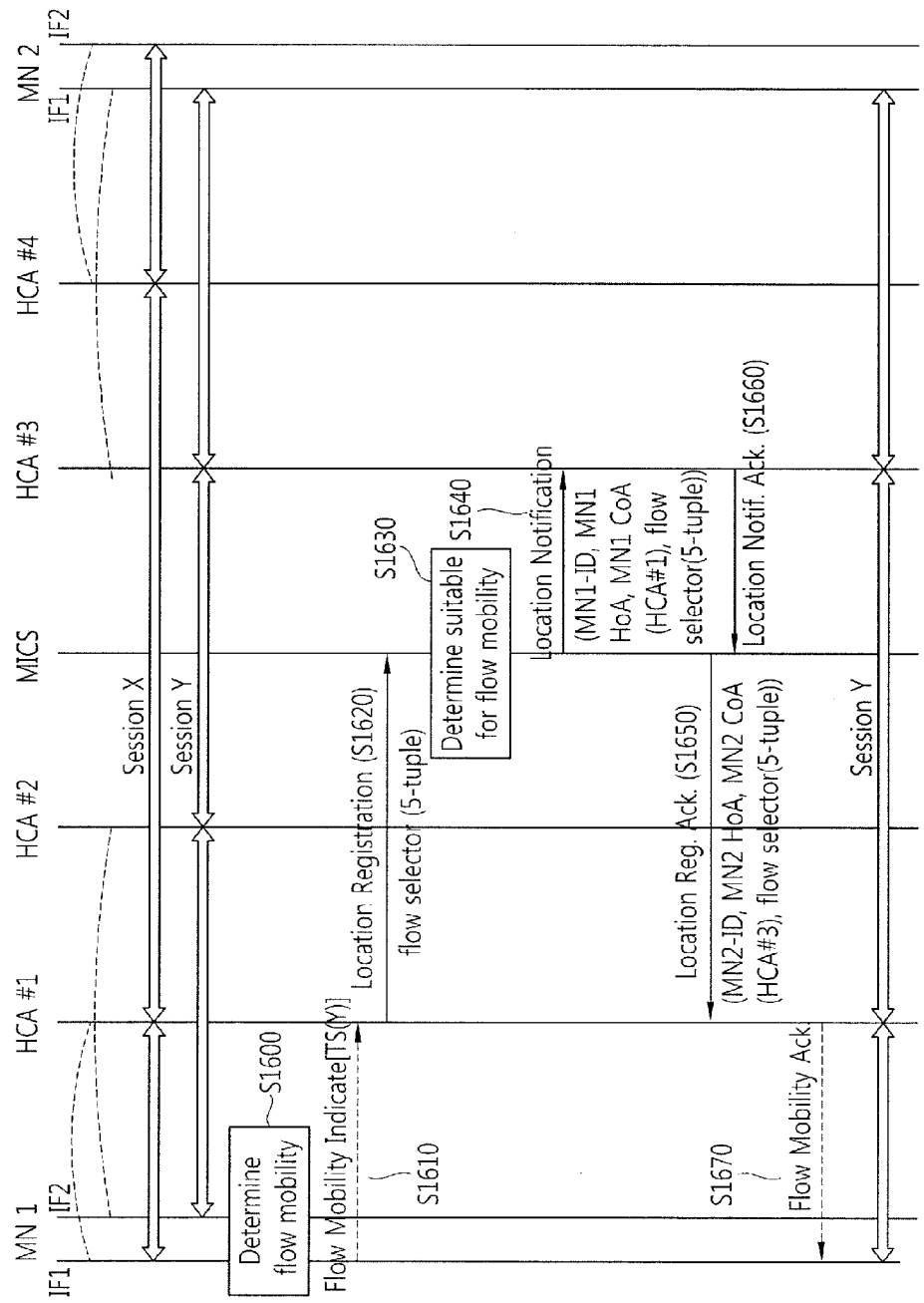
FIG. 16 is a flowchart illustrating in which a flow is moved under the determination of an MN and the determination of the suitability of an MICS in accordance with an example of the present invention.

FIG. 16 is a flowchart illustrating in which a flow is moved under the determination of an MN and the determination of the suitability of an MICS in accordance with an example of the present invention. FIG. 16 shows an example in which each of an MN1 and an MN2 connects two interfaces (e.g., 3G and WLAN) with a network and the MN1 and the MN2 exchange flows regarding a session X and a session Y. As described above, from a viewpoint of the MN1, the MN2 communicating with the MN1 may be called a CN, and vice versa.

Referring to FIG. 16, the session X is configured between the HCA#1 of the MN1 and the HCA#4 of the MN2, and the session Y is configured between the HCA#2 of the MN1 and the HCA#3 of the MN2. The MN1 determines a flow movement at step S1600. For example, the MN1 may determine to move a flow (i.e., this flow may be an outbound flow from a viewpoint of the MN1 and an inbound flow from a viewpoint of the MN2) from the MN1 to the MN2, from among the flows of the session Y, to a WLAN network (HCA#1) not the existing 3G network (HCA#2) of the MN2.

The MN1 sends a flow mobility indicate message to the HCA#1 at step S1610. Here, the MN1 sends a flow selector for the flow to be moved to the HCA#1 through the flow mobility indicate message. In other words, the flow mobility indicate message includes the flow selector for the flow that will be moved by the MN1.

In response to the flow mobility indicate message, the HCA#1 sends a location registration message, including the flow selector, to an MICS at step S1620.

The MICS determines suitability for the movement of the flow that is included in the location registration message including the flow selector and is requested by the MN1 at step S1630. The MICS may determine the suitability based on a network status. If a result of the determination is affirmative, the MICS inserts a dynamic entry, managed in a soft state, into its own flow binding table managed for the MN1. In this case, the flow binding table which is managed for the MN1 by the MICS and to which the dynamic entry has been newly added may have the following form.

TABLE 19

| Flow ID | Priority | Flow Selector | Binding IDs | Type | Lifetime |
|---|---|---|---|---|---|
| 101 | 5 | (IP2, IP1, 150, 399, UDP) | WL | Dynamic | 30 s |
| 4 | 4 | (IP2, *, 21, *, *) | WL→3G→WB | Static | ∞ |
| 3 | 3 | (*, *, 150, *, UDP) | 3G→WL→WB | Static | ∞ |
| 2 | 2 | (*, FF01::/64, *, *, *) | WL, 3G, WB | Default | ∞ |
| 1 | 1(The lowest) | (*, *, *, *, *) | 3G→WL→WB | Default | ∞ |

Referring to Table 19, the MN1 is receiving the existing inbound flow having a 5-tuple values (IP2, IP1, 150, 399, UDP) over a 3G network that is managed by the HCA#2 of a flow ID 3, and the MICS has added a dynamic entry, such as a flow ID 101 in order to move the 3G network to a WLAN managed by the HCA#1 under the determination of the MN1. The dynamic entry is a flow selector having detailed information on a corresponding flow, and lifetime for maintaining the soft state is set in the dynamic entry. Accordingly, if the corresponding flow is not received for a specific time or more, the corresponding entry is deleted, and the MN2 receives a subsequent inbound flow using an original static entry, that is, the flow ID 3.

Meanwhile, after adding the dynamic entry, the MICS sends a location notification message to the HCA#3 at step S1640. The location notification message includes an MN1-ID, an MN1 HoA, an MN1 CoA (HCA#1), and information on a flow selector for a flow transmitted from the MN2 to the MN1, from among the flows of the session Y. The MICS may enable the HCA#3 to perform a tunneling task through the location notification message. That is, the HCA#3 may change a point on the opposite side of the tunnel for the session Y.

Furthermore, the MICS sends a location registration Ack. message to the HCA#1 at step S1650. The location registration Ack. message includes an MN2-ID, an MN2 HoA, an MN2 CoA (HCA#3), and information on a flow selector for a flow transmitted from the MN1 to the MN2, from among the flows of the session Y. The location registration Ack. message may further include information on whether a flow movement requested by the MN1 is suitable or not.

If suitability for the flow movement requested by the MN1 is affirmative based on the location registration Ack. message, the HCA#1 generates a tunnel for the corresponding flow for the purpose of the HCA#3.

Meanwhile, the HCA#3 sends a location notification Ack. message to the MICS at step S1660.

The HCA#1 generates a flow mobility Ack. message and sends it to the MN1 at step S1670. The flow mobility Ack. message includes information on whether the flow movement requested by the MN1 is suitable or not. If suitability for the flow movement requested by the MN1 is affirmative, the MN1 may newly add a dynamic entry to its own flow binding list as follows.

TABLE 20

| Flow ID | Priority | Flow Selector | Outbound Interfaces | Type | Lifetime |
|---|---|---|---|---|---|
| 101 | 5 | (IP1, IP2, 399, 150, UDP) | WL | Dynamic | 30 s |
| 4 | 4 | (*, IP2, *, 80, *) | WL→3G→WB | Static | ∞ |
| 3 | 3 | (*, *, *, 150, UDP) | 3G→WL→WB | Static | ∞ |
| 2 | 2 | (*, FF02::/64, *, *, *) | WL, 3G | Default | ∞ |
| 1 | 1 (The lowest) | (*, *, *, *, *) | 3G→WL→WB | Default | ∞ |

Referring to Table 20, the MN1 is sending the existing outbound flow of (IP1, IP2, 399, 150, UDP) over a 3G network that is managed by the HCA#2 of the flow ID 3. The MN1 has added a dynamic entry, such as the flow ID 101, in order to move the corresponding flow to the WLAN managed by the HCA#1.

Figure 17:
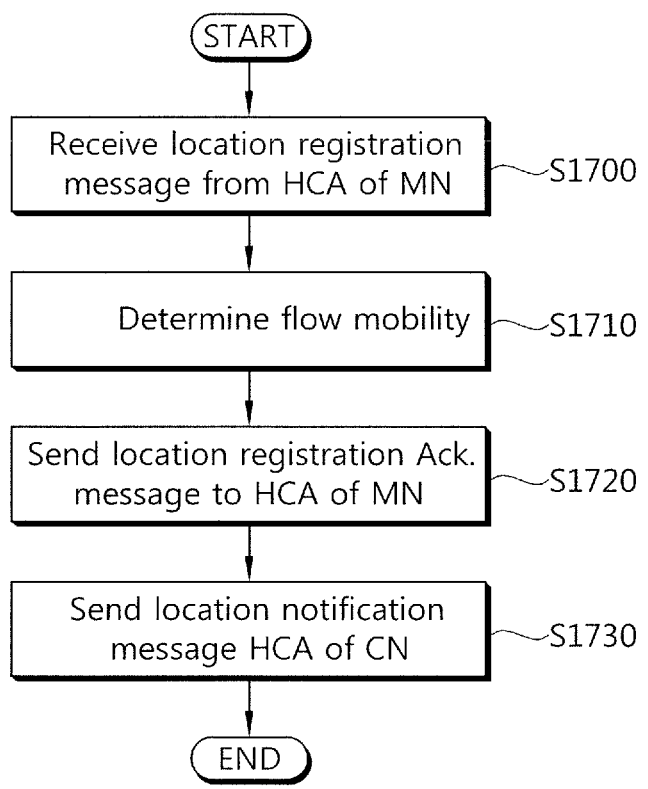
FIG. 17 is a flowchart illustrating the operation of an MICS which supports network-based flow mobility in accordance with an example of the present invention.

FIG. 17 is a flowchart illustrating the operation of an MICS which supports network-based flow mobility in accordance with an example of the present invention.

Referring to FIG. 17, the MICS receives a location registration message from a specific HCA connected to an MN at step S1700. Here, the location registration message may include the ID of the MN, the L2 ID of a physical interface of the MN, and information on the CoA of the HCA. The location registration message may further include information on a flow selector.

The MICS determines a movement of a flow, configured in the HCA to which the MN is connected, based on predetermined static flow binding information or a network status at step S1710. The MICS performs control so that a packet transmitted by the MN is transmitted to a HCA, indicated by the predetermined static flow binding information, based on the predetermined static flow binding information in relation to the packet.

For example, an MN transmits and receives a flow 1 and a flow 2 through a HCA#1 using a PI1, from among physical interfaces owned by the MN. Next, the MN has connected to a network through a HCA#2 using a PI2. If the PI2 is higher than the PI1 in the priority of the flow 2 according to the static flow binding information, the MICS may determine to move the corresponding flow.

For another example, an MICS can check a network status. For example, an MICS can check whether wired/wireless links operate or not, a congestion status, the number of terminals being served, and the number of flows and determine to move a corresponding flow based on the piece of information.

Meanwhile, if the MICS determines to move the flow based on the network status, the MICS may configure dynamic flow binding information according to a criterion in which moving the flow is soft under its determination and manage the configured dynamic flow binding information in its flow binding table. In this case, the dynamic flow binding information is managed in a soft state, and lifetime indicating that the corresponding information is a valid time is set in the dynamic flow binding information.

The MICS sends a location registration Ack. message to the specific HCA (e.g., the HCA#1) to which the MN is connected at step S1720. The location registration Ack. message includes mobility information on the flow. The mobility information is information on the configuration of the flow and a HCA connected to a Corresponding Node (CN). The mobility information includes the ID of the CN, the HoA of the CN, the CoA of a HCA (e.g., a HCA#4) in which the flow is configured and to which the CN is connected, and information on a flow selector. The location registration Ack. message may further include the dynamic flow binding information.

The MICS sends a location notification message to the HCA (e.g., the HCA#4) in which the flow is configured and to which the CN is connected at step S1730. The location notification message includes mobility information on the flow. The mobility information is information on the specific HCA to which the flow will be moved, and it includes the ID of the MN, the HoA of the MN, the CoA of the specific HCA (e.g., the HCA#1) to which the MN is connected, and information on the flow selector. The location notification message may further include the dynamic flow binding information.

In addition, the MICS may determine a flow movement independently based on the network status, etc. and send a location notification message to the HCA (e.g., the HCA#1) connected to the MN. In this case, the location notification message includes the ID of the CN, the HoA of the CN, the CoA of the HCA (e.g., the HCA#4) in which the flow is configured and to which the CN is connected, and information on the flow selector. The location notification Ack. message may further include the dynamic flow binding information.

Figure 18:
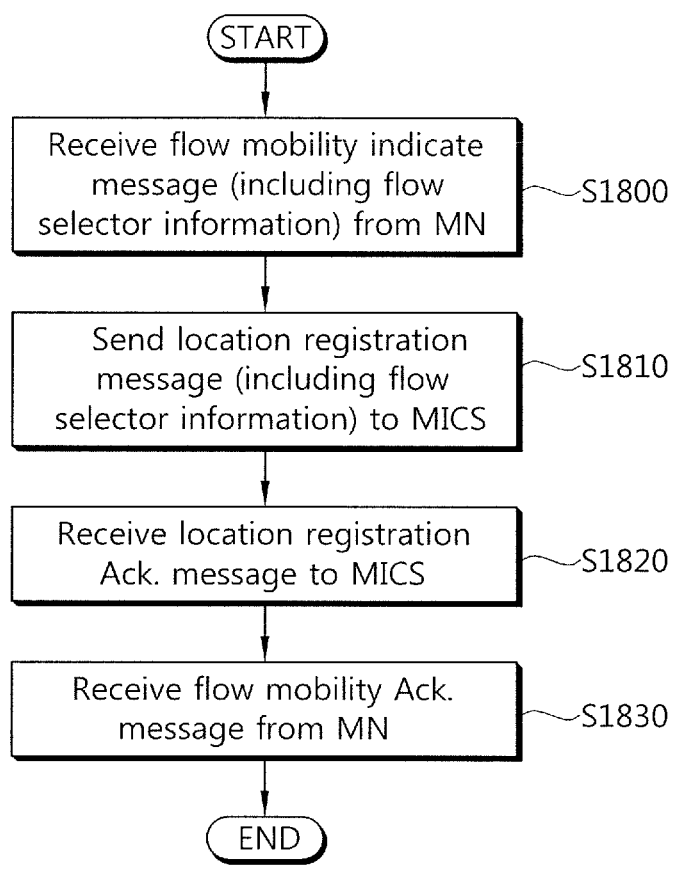
FIG. 18 is a flowchart illustrating the operation of a HCA which supports network-based flow mobility in accordance with an example of the present invention.

FIG. 18 is a flowchart illustrating the operation of a HCA which supports network-based flow mobility in accordance with an example of the present invention.

The HCA receives a flow mobility indicate message from an MN at step S1800. The flow mobility indicate message includes information on a flow selector, indicating that an MN moves a flow to an interface different from a physical interface based on static flow information in relation to a data packet received from a higher layer.

The HCA sends a location registration message to an MICS at step S1810. The location registration message includes information on a flow selector.

The HCA receives a location registration Ack. message from the MICS at step S1820. The location registration Ack. message includes movement information on the flow. The location registration Ack. message may further include suitability for the flow movement. The movement information includes the ID of a CN, the HoA of the CN, the CoA of a HCA (e.g., a HCA#4) in which the flow is configured and to which the CN is connected, and information on a flow selector. An NAI is used as the ID of the CN.

The HCA manages a Packet Forwarding Table (PFT). The HCA updates the PFT based on the information on a flow selector and performs tunneling to the HCA (e.g., the HCA#4) connected to the CN.

The location registration Ack. message may further include dynamic flow binding information configured by the MICS.

The HCA sends a flow mobility Ack. message to the MN at step S1830. The location registration Ack. message may further include information on suitability for the flow movement. The flow mobility Ack. message may further include dynamic flow binding information configured by the MICS.

Figure 19:
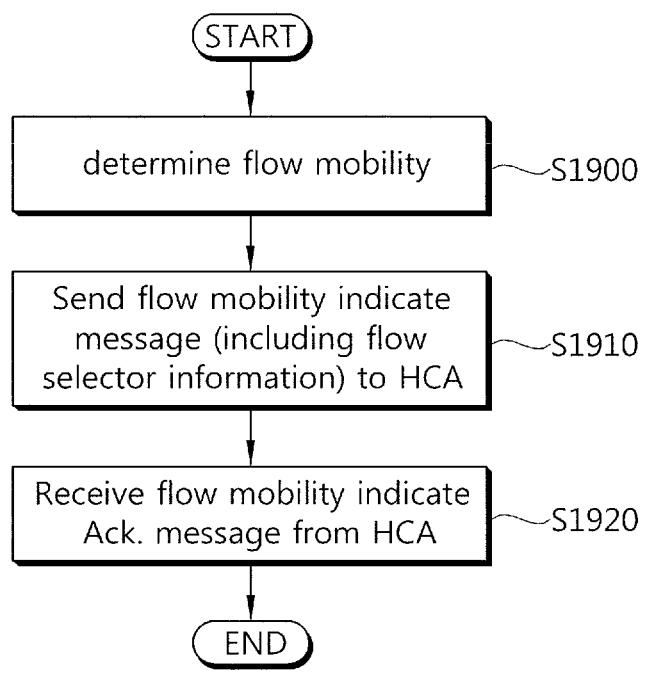
FIG. 19 is a flowchart illustrating the operation of an MN which supports network-based flow mobility in accordance with an example of the present invention.

FIG. 19 is a flowchart illustrating the operation of an MN which supports network-based flow mobility in accordance with an example of the present invention.

The MN determines a flow movement at step S1900. The MN includes a plurality of physical interfaces. The MN may determine to move a flow to an interface different from a physical interface based on static flow information, in relation to a packet downloaded from a higher layer.

The MN sends a flow mobility indicate message to the HCA of the MN at step S1910. The flow mobility indicate message includes information on a flow selector, indicating that the flow moves to an interface different from a physical interface based on static flow information in relation to the packet.

The MN receives a flow mobility indicate Ack. message from the HCA at step S1920. The flow mobility indicate Ack. message may include information on suitability for the flow movement. The flow mobility indicate Ack. message may further include dynamic flow binding information configured by an MICS. The MN manages a flow binding list and may add the dynamic flow binding information to the flow binding list.

As described above, the present invention provides the methods of supporting location registration and mobility for each service flow to a multi-mode MN having a plurality of wired/wireless network interfaces. Accordingly, in an environment in which a variety of wired/wireless networks overlap with one another, the resources of networks can be efficiently used because an MN can select and access an optimum communication network suitable for each service characteristic that is being used.

The above description is only an example of the technical spirit of the present invention, and those skilled in the art may change and modify the present invention in various ways without departing from the intrinsic characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the appended claims. Accordingly, the present invention should be construed as covering all modifications or variations induced from the meaning and scope of the appended claims and their equivalents.

What is claimed is:

1. A method of a Mobility Information Control Server (MICS) supporting flow mobility based on Access Independent Mobility Service (AIMS), the method comprising:
    receiving a location registration message from a first Handover Control Agent (HCA) connected to a Mobile Node (MN);
    determining a movement of a flow, configured in a second HCA to which the MN is connected, based on predetermined static flow binding information or a network status;
    sending a location registration Ack. message, comprising information on a third HCA in which the flow is configured and to which a Corresponding Node (CN) is connected, to the first HCA, wherein the information on the third HCA comprises an identifier (ID) of the CN, a home address (HoA) of the CN, a Care-of-Address (CoA) of the third HCA, and information on a flow selector for transmissions to the CN, and wherein a Network Access Identifier (NAI) is used as the ID of the CN; and
    sending a location notification message, comprising information on the first HCA to which the flow will be moved and to which the MN is connected, to the third HCA.

2. The method as claimed in claim 1, wherein the determination of the movement of the flow based on the predetermined static flow binding information is based on priority of the predetermined static flow binding information.

3. The method as claimed in claim 1, wherein the determination of the movement of the flow based on the network status is based on at least one of information on whether wired/wireless links operate or not, a congestion status, a number of MNs being served, and a number of flows.

4. The method as claimed in claim 1, further comprising configuring dynamic flow binding information if the movement of the flow is determined based on the network status, wherein the location registration Ack. message and the location notification message comprise the dynamic flow binding information.

5. The method as claimed in claim 1, wherein: the information on the first HCA comprises an ID of the MN, a HoA of the MN, a CoA of the first HCA, and information on a flow selector for transmissions to the MN, and an NAI is used as the ID of the MN.

6. A method of a Handover Control Agent (HCA) supporting flow mobility based on Access Independent Mobility Service (AIMS), the method comprising:
    receiving a flow mobility indicate message, comprising information on a flow selector indicating that a flow moves to an interface different from a physical interface based on static flow information in relation to a packet, from a Mobile Node (MN);
    sending a location registration message, comprising the information on the flow selector, to a Mobility Information Control Server (MICS);
    receiving a location registration Ack. message, comprising movement information on the flow, from the MICS; and
    sending a flow mobility Ack. message to the MN,
    wherein the movement information comprises an identifier (ID) of a Corresponding Node (CN), a home address (HoA) of the CN, a Care-of-Address (CoA) of an HCA in which the flow is configured and to which the CN is connected, and information on a flow selector for transmissions to the CN, and
    wherein a Network Access Identifier (NAI) is used as the ID of the CN.

7. The method as claimed in claim 6, wherein the flow mobility Ack. message comprises information on suitability for the movement of the flow.

8. The method as claimed in claim 6, further comprising updating a Packet Forwarding Table (PFT) based on the CoA of the HCA connected to the CN and the information on the flow selector.

9. The method as claimed in claim 6, further comprising performing tunneling to the HCA connected to the CN.

10. The method as claimed in claim 6, wherein the location registration Ack. message and the flow mobility Ack. message comprise dynamic flow binding information.

11. A method supporting flow mobility based on Access Independent Mobility Service (AIMS), the method comprising:

determining, by a mobile node (MN), a movement of a flow to an interface different from a physical interface based on static flow information in relation to a packet;

sending, by the MN, a flow mobility indicate message, comprising information on a flow selector indicating the movement of the flow to the interface different from the physical interface based on the static flow information in relation to the packet, to a Handover Control Agent (HCA);

sending, by the HCA, a location registration message, comprising the information on the flow selector, to a Mobility Information Control Server (MICS);

receiving, by the HCA, a location registration Ack. message, comprising movement information on the flow, from the MICS;

receiving, by the MN, a flow mobility indicate Ack. message from the HCA, wherein the movement information comprises an identifier (ID) of a Corresponding Node (CN), a home address (HoA) of the CN, a Care-of-Address (CoA) of another HCA in which the flow is configured and to which the CN is connected, and information on a flow selector for transmissions to the CN, and wherein a Network Access Identifier (NAI) is used as the ID of the CN.

12. The method as claimed in claim 11, wherein the flow mobility indicate message comprises information on suitability for the movement of the flow.

13. The method as claimed in claim 11, wherein the flow mobility Ack. message comprises dynamic flow binding information.

14. The method as claimed in claim 13, further comprising adding the dynamic flow binding information to a flow binding list.

* * * * *